United States Patent
Levinbook et al.

(10) Patent No.: US 11,108,609 B2
(45) Date of Patent: Aug. 31, 2021

(54) EFFICIENT DESIGN AND IMPLEMENTATION OF SYNTHESIS OF NEAR-CONSTANT MODULUS (STORM) WAVEFORM

(71) Applicant: Huawei Technologies Co., Ltd., Shenzhen (CN)

(72) Inventors: Yoav Levinbook, Hod Hasharon (IL); Doron Ezri, Hod Hasharon (IL); Ezer Melzer, Hod Hasharon (IL)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/806,607

(22) Filed: Mar. 2, 2020

(65) Prior Publication Data

US 2020/0204421 A1  Jun. 25, 2020

Related U.S. Application Data

(63) Continuation of application No. PCT/EP2017/071654, filed on Aug. 29, 2017.

(51) Int. Cl.
*H04L 27/26* (2006.01)
*H04B 1/02* (2006.01)
(Continued)

(52) U.S. Cl.
CPC ......... *H04L 27/2636* (2013.01); *H04B 1/02* (2013.01); *H04B 1/06* (2013.01); *H04J 1/02* (2013.01);
(Continued)

(58) Field of Classification Search
CPC .............. H04L 27/2636; H04L 5/0048; H04L 27/2607; H04L 27/261; H04L 27/2614;
(Continued)

(56) References Cited

U.S. PATENT DOCUMENTS

| | | | |
|---|---|---|---|
| 6,175,551 B1* | 1/2001 | Awater | H04B 1/707 370/203 |
| 10,680,870 B2* | 6/2020 | Levinbook | H04L 27/2602 |

(Continued)

FOREIGN PATENT DOCUMENTS

| | | |
|---|---|---|
| CN | 102017486 A | 4/2011 |
| WO | 2018086684 A1 | 5/2018 |

OTHER PUBLICATIONS

"Part 11: Wireless LAN Medium Access Control (MAC) and Physical Layer (PHY) Specifications-Amendment 3: Enhancements for Very High Throughput in the 60 GHz Band," IEEE 802.11ad standard, total 628 pages, Institute of Electrical and Electronics Engineers, New York, New York (Dec. 28, 2012).

(Continued)

*Primary Examiner* — Dac V Ha

(74) *Attorney, Agent, or Firm* — Leydig, Voit & Mayer, Ltd.

(57) ABSTRACT

A transmitter includes a processor configured to convert a primary sequence of modulation symbols into a primary signal using a universal pulse shape. The processor is further configured to convert an auxiliary sequence of modulation symbols, created from the primary sequence, to an auxiliary signal using an altered version of the universal pulse shape. In addition, the processor is configured to combine the primary signal and the auxiliary signal to create a joint output signal.

20 Claims, 20 Drawing Sheets

(51) Int. Cl.
*H04B 1/06* (2006.01)
*H04J 1/02* (2006.01)
*H04L 5/00* (2006.01)
*H04L 25/03* (2006.01)

(52) U.S. Cl.
CPC .......... *H04L 5/0007* (2013.01); *H04L 5/0048* (2013.01); *H04L 27/261* (2013.01); *H04L 27/2607* (2013.01); *H04L 27/2614* (2013.01); *H04L 27/2649* (2013.01); *H04L 25/03834* (2013.01)

(58) Field of Classification Search
CPC ........... H04L 27/2649; H04L 25/03834; H04L 27/2627; H04L 27/2602; H04B 1/02; H04B 1/06; H04J 1/02; H04J 5/0007
See application file for complete search history.

(56) References Cited

U.S. PATENT DOCUMENTS

2001/0054931 A1* 12/2001 Bar-David .............. H03F 1/025
330/10
2007/0211807 A1 9/2007 Han et al.
2007/0211829 A1* 9/2007 Liang ................ H04L 25/03834
375/320
2018/0287753 A1* 10/2018 Sun ...................... H04L 27/2613
2018/0358930 A1* 12/2018 Haine ..................... H03F 3/193

OTHER PUBLICATIONS

"Discussion on further PAPR reduction for uplink DFT-S-OFDM," 3GPP TSG RAN WGl NR Ad Hoc Meeting, R1-1700077, Spokane, USA, total 6 pages, 3rd Generation Partnership Project, Valbonne, France (Jan. 16-20, 2017).
"3rd Generation Partnership Project;Technical Specification Group Radio Access Network;Evolved Universal Terrestrial Radio Access (E-UTRA);User Equipment (UE) radio transmission and reception(Release 14)," 3GPP TS 36.101 V14.4.0, total 1449 pages, 3rd Generation Partnership Project, Valbonne, France (Jun. 2017).
EZRI, "Introducing STORM-Near 0db PART Waveform for mmWave 5G," Huawei tel-Aviv Research Center, XP55394083A, total 23 pages, (May 1, 2017).
"Comparison of pi/2 BPSK with and without frequency domain pulse shaping: Results with PA model," 3GPP TSG RAN WG1 AH_NR Meeting, R1-1700849,Spokane, USA, total 8 pages, 3rd Generation Partnership Project, Valbonne, France (Jan. 16-20, 2017).
"Realistic power amplifier model for the New Radio evaluation," 3GPP TSG-RAN WG4 Meeting #79, R4-163314, Nanjing, China, total 8 pages, 3rd Generation Partnership Project, Valbonne, France (May 23-27, 2017).

* cited by examiner

EFFICIENT DESIGN AND IMPLEMENTATION OF SYNTHESIS OF NEAR-CONSTANT MODULUS (STORM) WAVEFORM

CROSS-REFERENCE TO RELATED APPLICATIONS

This application is a continuation of International Application No. PCT/EP2017/071654, filed on Aug. 29, 2017, the disclosure of which is hereby incorporated by reference in its entirety.

REFERENCES CITED

Patent Cooperation Treaty (PCT) Application No. PCT/EP2016/077147, titled "Synthesis of Near-Constant Modulus Waveform for High Frequency Transmission."

3GPP TSG RAN WG1 email discussion "[85-18] PA assumption for NR," June 2016.

FIELD

The present invention, in some embodiments thereof, relates to generating a wireless signal having a low Peak to Average Power Ratio (PAPR) and, more specifically but not exclusively, to generating a low-PAPR wireless signal by complementing a signal created using a universal pulse shape with one or more auxiliary signals created using altered versions of the universal pulse shape in order to increase constancy of the amplitude of the signal.

BACKGROUND

Wireless communication, in particular cellular communication, is rapidly evolving to provide higher performance, for example, increased throughput, improved bandwidth (BW) utilization, enhanced coverage, reduced cost equipment and/or the like.

The superior behavior of Single-Carrier Frequency Division Multiplexing (SC-FDM) signals (also known as Discrete Fourier Transform spread Orthogonal Frequency Division Multiplexing (DFT-s-OFDM) signals) over OFDM in terms of performance, in particular due to having reduced PAPR, was the main motivation for adopting SC-FDM as the modulation technique for a plurality of applications, including, for example, the Long Term Evolution (LTE) uplink.

SUMMARY

According to a first aspect of the present disclosure, there is provided a transmitter comprising a processor adapted to, convert a primary sequence of modulation symbols into a primary signal, using a universal pulse shape, convert an auxiliary sequence of modulation symbols, created from the primary sequence, to an auxiliary signal using an altered version of the universal pulse shape and combine the primary signal and the auxiliary signal to create a joint output signal.

According to a second aspect of the present disclosure, there is provided a receiver, comprising a processor adapted to demodulate an input signal received from a transmitter, the input signal is a joint signal created by combining a primary signal and an auxiliary signal. Wherein the primary signal is created by converting a primary sequence of modulation symbols using a single universal pulse shape and the auxiliary signal is created by converting an auxiliary sequence of modulation symbols using an altered version of the universal pulse shape.

Creating a joint signal using a universal pulse shape is the essence of creating a universal SynThesis Of a neaR-constant Modulus (STORM) signal which may significantly increase constancy of the signal's amplitude and hence reduce Peak to Average Power Ratio (PAPR) of the signal. Reducing the PAPR may significantly increase the output power back-off (OBO) of the non-linear power amplifier (PA) typically used in the transmitter thus allowing utilization of simpler, less costly PAs. Using the universal pulse shape may further reduce complexity of the transmitter and/or receiver since the primary signal (sequence) and the auxiliary signal(s) (sequence(s)) may be easily joined as they apply the basic pulse shape with some alteration, specifically time shift and/or attenuation.

In a further implementation form of the first and/or second aspects, the PAPR of the output signal is lower than the PAPR of the primary signal. This is the goal of applying the universal STORM implementation and is achieved by complementing a primary sequence carrying the data to be transmitted with one or more auxiliary signals to improve constancy of the joint signal amplitude and hence reduce the PAPR.

In a further implementation form of the first and/or second aspects, the altered version of the universal pulse shape comprises an alteration via a shift in time and/or attenuation of the universal pulse shape. Altering the universal pulse shape in terms of time shift and/or attenuation may allow significant simplification of the transmitter and/or the receiver which may apply significantly simpler operations creating (joining) and/or disassembling the joint signal.

In a further implementation form of the first and/or second aspects, the processor is adapted to perform the operation of combining the primary signal and the auxiliary signal at the level of the respective modulation symbol sequences to generate an intermediate joint sequence of modulation symbols, possibly at an up-sampled rate with respect to the primary sequence, using information about the alteration of the universal pulse shape. This may allow further flexibility in implementing the transmitter and/or the receiver in order to adapt to the required transmission scheme.

In a further implementation form of the first and/or second aspects, the universal pulse shape is a Gaussian pulse shape or an approximation thereof. The Gaussian pulse shape may serve as a preferred candidate for creating the universal STORM signal due to its simple shape and uniform distribution in the time domain and/or the frequency domain.

In a further implementation form of the first and/or second aspects, the primary sequence of modulation symbols maps an input bit stream according to one or more of a plurality of modulation schemes, including:

Binary-Phase Shift Keying (BPSK) modulation scheme
Quadrature-Phase Shift Keying (QPSK) modulation scheme
Higher order Phase Shift Keying (PSK) modulation scheme
Quadrature-Amplitude Modulation (QAM) scheme The primary sequence and the auxiliary sequence further going through complex phase rotation between consecutive symbols by a fraction of Tr. Supporting the plurality of modulation schemes may allow significant flexibility for adapting the transmitter and/or the receiver to support a plurality of transmission protocols, bandwidth requirements and/or the like. Applying the phase rotation may provide improved immunity to inter-symbol interference (ISI).

In an optional implementation form of the first and/or second aspects, two or more of a plurality of modulation schemes are selected (switched) while mapping the input bit stream to the primary sequence of modulation symbols. Switching between the modulation schemes may allow applying a most suitable modulation scheme for one or more segments of the transmitted joint signal. For example, the transmitted data may be modulated using a high bandwidth modulation scheme such as, for example, QPSK, 8 phase-shift keying (8PSK), QAM and/or the like while for simplicity demodulation reference signals (DMRS) data may be modulated with a lower bandwidth modulation scheme such as, for example, BPSK.

In a further implementation form of the first and/or second aspects, the auxiliary sequence is created from the primary sequence by generating each modulation symbol of the auxiliary sequence from a corresponding modulation symbol of the primary sequence and at one preceding or subsequent modulation symbol of the primary sequence. Creating the auxiliary sequence symbols according to adjacent primary sequence symbols may significantly improve the PAPR as the auxiliary symbols may be created to compensate, uniform and/or equalize the respective primary symbols in the joint signal.

In a further implementation form of the first and/or second aspects, the processor is configured to perform one or more of the following operations to the primary sequence, or to the auxiliary sequence, or to a combined joint sequence thereof:
  When the processing is in frequency domain:
    Discrete Fourier transformation (DFT)
    Cyclic extension
    Filtering process with information about the universal pulse shape and/or about the altered version of the universal pulse shape
  When the processing is in time domain:
    Up-sampling
    Filtering process with information about the universal pulse shape and/or about the altered version of the universal pulse shape One or more of these processing operations may be required during the processing sequence of the primary signal, the auxiliary signals and/or the joint signal for converting the signals between the time and the frequency domain, for adapting the signals to the desired transmission and/or the like.

In an optional implementation form of the first and/or second aspects, a plurality of finite sub-sequences of consecutive symbols of the primary sequence are extended to create a plurality of respective finite sub-sequences of consecutive symbols of the auxiliary sequence. This may be done to create a plurality of primary sub-sequences from the sequence of input symbols (mapping the data to be transmitted) and respective finite auxiliary sub-sequences that may be transformed to the frequency domain through application of the DFT.

In a further implementation form of the first and/or second aspects, the processor is adapted for transmission of the output signal using any one of:
  Frequency division multiplexing (FDM)
  Discrete-Fourier-transform (DFT) spread Orthogonal FDM (DFT-s-OFDM)
  Single carrier FDM (SC-FDM)
  Transmission based on frequency division multiple access (FDMA)
  Transmission based on Interleaved FDMA (IFDMA).

Supporting the plurality of transmission schemes may allow applying the universal STORM methodology and implementation for a plurality of commonly used and deployed applications, networks, systems, infrastructures and/or the like.

In a further implementation form of the first and/or second aspects, the processor is adapted to periodically insert one or more fixed finite sequences of symbols, including a unique word (UW) into the primary sequence. Inserting the UW into the primary, auxiliary and/or joint signal may significantly increase immunity of the respective sequences and hence the resulting signals to ISI. This may also improve periodic synchronization of the receiver according to the detected UWs.

In a further implementation form of the first and/or second aspects, the processor is adapted to periodically insert guard intervals (GI) into the time domain joint output signal, the guard intervals include one or more members of:
  Cyclic prefix (CP)
  Cyclic postfix
  Zero prefix (ZP)
  Zero tail (ZT)

Inserting the GIs into the primary, auxiliary and/or joint signal may significantly increase immunity of the respective sequences and hence the resulting signals to ISI. This may also improve periodic synchronization of the receiver according to the detected GIs.

In a further implementation form of the first and/or second aspects, the processor is adapted to create the output signal to comply with one or more of a plurality of signal spectral constraints. Adapting the output signal for a plurality of spectral constraints may allow adapting the transmitter and/or the receiver for a plurality of commonly used commonly used and deployed applications, networks, systems, infrastructures and/or the like.

In a further implementation form of the first aspect, the processor is adapted to create one or more demodulation reference signals (DMRS) similarly to the output signal. The DMRS may be used for a plurality of purposes, for example, channel estimation (CE) at the receiver, supervisory and/or control of the transmission, equalization, continuity, synchronization and/or the like.

In a further implementation form of the second aspect, the processor is adapted to apply a single whitening matched filter (WMF) to the input signal in frequency domain, using information about the universal pulse shape, to extract a signal from which a transmitted data stream may be further detected. Due to the simplified implementation of the universal STORM, the receiver design, implementation and/or construction may be significantly reduced to use a single WMF.

In a further implementation form of the second aspect, the processor is adapted to use one or more DMRS signals to demodulate the input signal. The DMRS may be used for a plurality of purposes, for example, CE at the receiver, supervisory and/or control of the transmission, equalization, continuity, synchronization and/or the like.

Unless otherwise defined, all technical and/or scientific terms used herein have the same meaning as commonly understood by one of ordinary skill in the art. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be limiting.

BRIEF DESCRIPTION OF THE SEVERAL VIEWS OF THE DRAWINGS

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the drawings.

DETAILED DESCRIPTION

Figure 1:
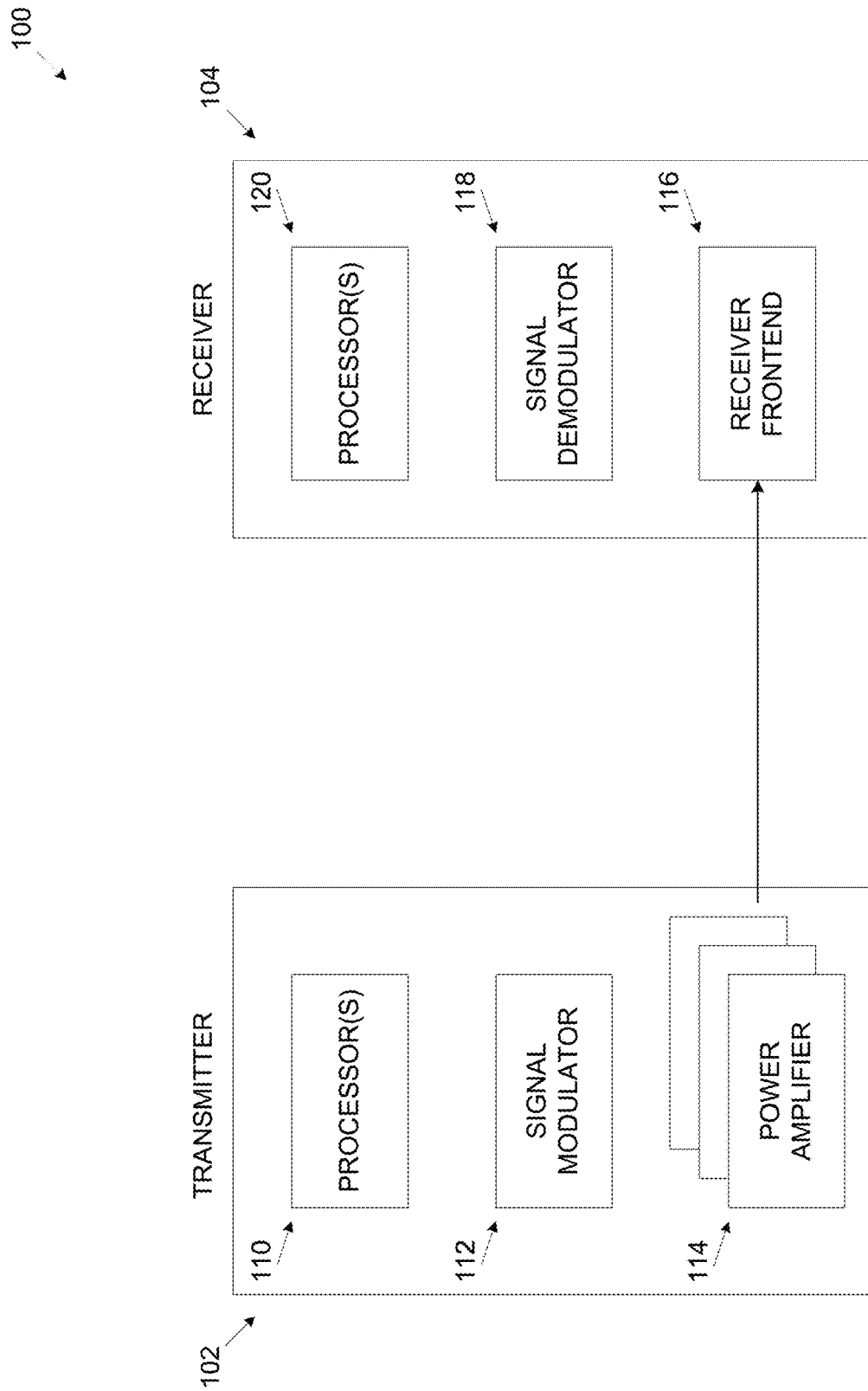
FIG. 1 is a schematic illustration of a system for reducing PAPR of a wireless signal by complementing the signal which is created using a universal pulse shape with one or more auxiliary signals created using altered versions of the universal pulse shape to increase constancy of the amplitude of the signal, according to an embodiment.

The present disclosure relates to generating a wireless signal having a low Peak to Average Power Ratio (PAPR) and, more specifically, but not exclusively, to generating a low-PAPR wireless signal by complementing the signal which is created using a single universal pulse shape with one or more auxiliary signals created using altered versions of the universal pulse shape to increase constancy of the amplitude of the signal.

The present disclosure presents devices, systems and methods for generating SynThesis Of a neaR-constant Modulus (STORM) signals exhibiting high amplitude constancy and hence reduced PAPR, in particular, using a single universal (unique) pulse shaping function to construct the STORM signals to reduce complexity and/or cost of the transmitter and/or receiver used for operating a STORM-based radio link. The universal function based STORM technique, designated U-STORM, may be applied for generating wireless transmission signals compliant with one or more of a plurality of modulation, multiplexing and multiple access (MA) schemes, for example, a Frequency Division Multiplexing (FDM), a Discrete Fourier Transform spread Orthogonal FDM (DFT-s-OFDM), a Single Carrier (SC) FDM (SC-FDM), a transmission based on Frequency Division Multiple Access (FDMA), a transmission based on Interleaved FDMA (IFDMA) and/or the like utilizing high frequency bands, for example, above 6 GHz. The U-STORM technique may be further applied for generating SC signals.

The U-STORM technique is based on generating one or more auxiliary sequences based on a primary sequence carrying a (to be) transmitted data stream. The primary sequence signal is joined through, for example, superposition, combining, summing and/or the like with the auxiliary sequence signal(s) that complement the primary signal, where the auxiliary signal(s) rectifies the nonzero PAPR of the primary signal to form the U-STORM signal having increased amplitude constancy and thus reduced PAPR.

The U-STORM technique further simplifies the STORM technique presented in PCT Application No. PCT/EP2016/077147 titled "Synthesis of Near-Constant Modulus Waveform for High Frequency Transmission" by significantly simplifying the implementation of the transmitter and/or the receiver while insignificantly degrading the radio link performance, in particular, the PAPR performance, the detection performance, the output power performance at the transmitter and/or the overall link performance (e.g. spectral efficiency, throughout and/or the like per given bandwidth).

In order to efficiently complement each other while requiring simplified components for combining (at the transmitter) and jointly detecting (at the receiver), the primary and auxiliary signals are generated using a single universal function, for example, a Gaussian function for constructing primary and auxiliary pulse shapes, respectively. The use of the single universal function for constructing both the primary signal as well as the auxiliary signal(s) may allow a simple joint operation which mainly involves combining attenuation parameters (gain factor values) and/or time shift (delay) parameters applied to the auxiliary signal(s).

To further increase the amplitude constancy of the U-STORM signal, the auxiliary sequences of modulation symbols from which the auxiliary signal(s) are generated comprise modulation symbols which depend on respective modulation symbols of a primary sequence from which the primary signal is generated. The primary modulation symbol sequence maps a (to be) transmitted data bit stream in one or more of a plurality of modulation schemes, for example, Binary Phase-shift Keying (BPSK), Quadrature Phase-shift Keying (QPSK), 8 Phase-shift Keying (8PSK), higher order Phase Shift Keying (PSK), Quadrature Amplitude Modulation (QAM) and/or the like.

The U-STORM technique may present multiple advantages compared to currently existing systems and/or methods used for reducing the PAPR of wireless transmission signals.

One of the main problems involved with wireless transmission signals, in particular for OFDM-based signals (including SC-FDM signals), is their relatively high PAPR. The high PAPR implies that the maximum (peak) amplitude may be significantly higher than the mean amplitude of the transmitted signal. The high PAPR forces the transmitted signals to be significantly attenuated before being fed into a non-linear Power Amplifier (PA) of a wireless transmitter. The attenuation is required in order to ensure that the (non-linear) PA is operating in its (near-linear) operational region and to prevent the PA from entering its saturation region when the amplitude of the (to be) transmitted signal at the PA input is relatively high, thus limiting an undesirable distortion of the transmitted signal. This means that the entire amplitude scale of the transmitted signal may be reduced, due to the required attenuation, such that the maximal amplitude is still within the operational region of the PA. This attenuation is referred to as Input power Back-Off (IBO), resulting in an Output power Back-Off (OBO) of the PA. It is naturally desired to reduce the OBO as much as possible in order to achieve increased gain for the transmitted signal for one or more reasons, for example, increase communication link coverage range, enabling usage of lower efficiency PAs (i.e. cheaper PAs) in the transmitting equipment and/or the like, while still maintaining spectral containment of the transmitted signal.

To mitigate the PAPR problem of various waveforms, including and particularly OFDM-based waveforms, some of the currently existing methods may apply one or more add-ons to the transmitter (at different digital-baseband processing stages), for example, clipping or companding and filtering (CAF), Tone Reservation (TR), Tone Insertion/Injection (TI), Peak Cancellation, Selective Mapping (SLM), Partial Transmit Sequences (PTS) and Active Constellation Extension (ACE). Some of the currently existing methods may further employ Weighted OverLap & Add (WOLA) and/or filtering (i.e. filtered-OFDM) on the concatenated sequence of OFDM symbols to improve the spectral properties of the overall signal. Although occasionally having only a marginal impact on the PAPR, such processing may allow further reduction of the OBO, which is of particular interest when the transmitted signal should comply with strict requirements on the In-Band Emission (IBE) and/or Out-Of-Band Emission (OOBE), including constraints defined, for example, in terms of a Spectral Emission Mask (SEM).

The existing PAPR reduction techniques, present some disadvantages due to tradeoffs between one or more characteristics of the transmitted signal, for example:

An explicit Spectral Efficiency (SE) loss implied by decreasing the number of data-carrying subcarriers and/or an implicit SE loss due to unavoidable detection losses of the modified waveform of the signal.

A distortion of the transmitted signal which cannot be compensated at the receiver, thus causing undesired OOBE and/or IBE, the latter being measured in terms of Error Vector Magnitude (EVM).

An Increased complexity in the design and/or production of the transmitting and/or receiving equipment that may translate to, for example, increased costs, increased power consumption, reduced battery life and/or the like.

Another approach used by the existing techniques of PAPR reduction of OFDM-based waveforms is to perform a DFT precoding (or spreading) of the modulated QAM symbols to manipulate their frequency domain samples using some filtering process before mapping it onto the Inverse Fast Fourier Transform (IFFT) input of the OFDM modulator, which converts the signal back to time domain. This may allow taking advantage of the Frequency Domain Equalization (FDE) of the OFDM signal at the receiver while reducing the PAPR of the signal to be transmitted. However, the filters used in the frequency domain processing at the transmitter may be typically constrained to satisfy the Nyquist criterion in order to avoid introduction of Inter-Symbol Interference (ISI) between the QAMs within each OFDM symbol.

Applying the STORM technique to SC-FDM-based waveforms may significantly reduce the PAPR of the transmitted signal, thus reducing the OBO of the PA. Consequently, the STORM technique presents a plurality of additional advantages, for example:

The STORM implementation is based on the SC-FDM modulator with minor modifications hence implying a minor complexity increase to the transmitter's implementation.

Using specially crafted pulse shapes for generating the STORM signal allows compliance with requirements of SEM, Adjacent-Carrier Leakage Ratio (ACLR) and EVM.

If the power of the auxiliary signal is significantly smaller than the power of the primary signal, for example, by 17 dB, a receiver receiving the STORM signal may process the received signal while ignoring its auxiliary component(s), which may be implemented with a small complexity increase relative to a standard SC-FDM receiver.

The STORM implementation, however, may present some complexity in the design and implementation of the transmitter and/or receiver, in particular for modulation order higher than BPSK (as in B-STORM), for example, QPSK, 8PSK, higher order PSK, QAM and/or the like, where the power of the auxiliary signals may not be negligible compared to the power of the primary signal and thus may not be ignored when demodulating the STORM signal at the receiver. In addition, waveforms based on the higher modulation order schemes may require additional, typically more complex, processing resources to generate the auxiliary sequences and auxiliary signals.

The U-STORM implementation may therefore present further advantages over the STORM implementation. Since the U-STORM implementation utilizes a single function to construct the primary signal as well as all the auxiliary signals, the joining process at the transmitter to combine the primary signal with the auxiliary signals to produce a low-PAPR U-STORM signal may be significantly simplified. The joining process of the signals involves altered versions of the same single universal pulse shaping function, and therefore may typically be translated into a simple combining operation of the primary sequence together with the auxiliary symbol sequences after applying to them certain attenuation levels and/or time shifts. Such a combining operation may be conducted using significantly reduced computing resources compared to the generic STORM implementation. The simplified implementation of the U-STORM may also significantly simplify the design and implementation of the receiver, which may require significantly reduced computing resources compared to the generic STORM demodulator implementation in the process of extracting the transmitted data.

Before explaining at least one embodiment, it is to be understood that the invention is not limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer such as the user equipment (UE), as a stand-alone software package, partly on the user's computer and partly on a remote computer such as the network apparatus or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a schematic illustration of a system for reducing PAPR of a wireless signal by complementing the signal which is created using a universal pulse shape with one or more auxiliary signals created using altered versions of the universal pulse shape to increase constancy of the signal's amplitude, according to some embodiments. A system 100 includes a transmitter 102 transmitting to a receiver 104 a wireless signal compliant with one of a plurality of radio access physical layer specifications, for example, based on FDM, DFT-s-OFDM, SC-FDM, FDMA, IFDMA and/or the like in one of a plurality of frequency bands, for example, between 6-100 GHz. The wireless signal may be utilized for one or more of a plurality of cellular communication applications, for example, a cellular uplink (UL), a cellular downlink (DL), and/or the like. The wireless signal may be further utilized for one or more of a plurality of general wireless applications, for example, a Wireless Local Area Network (WLAN) such as, for example, Wi-Fi and/or the like. Typically, but not exclusively, the wireless signal is utilized for uplink such that the transmitter 102 may be integrated in an endpoint device, for example, a cellular UE, a WLAN node and/or the like, while the receiver 104 may typically, but not exclusively, be integrated in a network infrastructure apparatus, for example, a node B (NB), an evolved NB (eNB), a Base Station (BS) and/or a WLAN Access Point (AP). However, as discussed before, since in some applications the RF channel may be utilized for downlink and/or general wireless transmission, the transmitter 102 and/or the receiver 104 may be integrated in any one or more network apparatuses of the network to be used at either end (uplink, downlink, sidelink, general transmission and/or the like) of the network.

The transmitter 102 may include a processor(s) 110 for collecting (receiving) the (to be) transmitted data and generating the transmitted output signal, a signal modulator 112 for modulating the output signal and one or more PAs 114 for transmitting the output signal. The signal modulator 112 may be integrated with the processor(s) 110 such that the processor(s) 110 performs the signal modulation. The processor(s) 110 may include one or more processors (homogenous or heterogeneous), which may be arranged for parallel processing, as clusters and/or as one or more multi core processing units. The processor(s) 110 may include one or more co-processors, support hardware processing units, function specific processors and/or the like. For example, the processor(s) 110 may include a Digital Signals Processor (DSP), a communication processor, a hardware signal processing Integrated circuit (IC), a Single instruction, multiple data (SIMD) processor and/or the like for creating, modulating and/or adjusting the output signal. The processor(s) 110 may execute one or more software modules for creating, modulating and/or adjusting the output signal. Each of the software module(s) comprises a plurality of program instructions that may be executed by the processor(s) 110 from one or more persistent and/or volatile memory devices, for example, a Read Only Memory (ROM), a Random Access Memory (RAM), a Flash array, a memory card and/or the like. Since typically, the transmitter 102 is integrated in the end devices that in many application may be a mobile device, the PA(s) 114 are typically smaller, cheaper and more power saving oriented.

The receiver 104 comprises a receiver 116 for receiving the output signal of the transmitter 102, a signal demodulator 118 for demodulating the output signal and a processor 120 such as the processor(s) 110 for extracting, reconstructing and/or processing the data encoded in the output signal. The signal demodulator 118 may be integrated with the processor(s) 120 such that the processor(s) 120 performs the signal demodulation. The processor(s) 120 execute one or more software modules and/or may use one or more of the co-processors, the support hardware processing units, the function specific processors and/or the like for extracting, reconstructing and/or processing the data encoded in the output signal.

The transmitter 102 and receiver 104 may contain additional components and modules whose roles are irrelevant for the current presentation and are therefore not shown in FIG. 1 for reasons of clarity.

Before further explaining at least some embodiments for improving the STORM signals generation, the STORM architecture, methodologies and implementations developed hitherto are first described.

STORM Architecture

As described in PCT Application No. PCT/EP2016/077147 titled "Synthesis of Near-Constant Modulus Waveform for High Frequency Transmission", the concept underlying STORM consists of transmitting a joint signal, for example, a superposition of a plurality of SC[-FDM] signals, a primary signal carrying the (to be) transmitted data, together with one or more auxiliary signal(s). The data encoded in the auxiliary signal(s) is derived from the data of the primary signal to significantly reduce computations resources by reducing and/or completely avoiding iterative, data-dependent computations typically applied by other PAPR reduction methods and/or systems. Pulse shaping of the primary signals and the auxiliary signal(s) is done using specially crafted interrelated pulse shapes (filters), selected such that the resulting joint (combined) signal has a near-constant modulus envelope, which may be characterized by very low PAPR.

Several implementation parameters may be tuned to enable adaptation of the STORM implementation to various different use cases and/or scenarios through a tradeoff between OBO gains (dependent on the attributes of the PA and/or on spectral requirements and/or regulations), spectral efficiency, detection performance and/or complexity of the transmitter 102 and/or the receiver 104. These implementation parameters may include, for example, a modulation scheme of the encoded data (e.g., pi/2-BPSK, pi/4-QPSK, etc.), the pulse shape or equivalently Frequency Domain Spectral Shaping (FDSS) filter(s) of the primary and/or auxiliary signals, a number and/or type of the auxiliary signals used to construct the joint signals and/or the like.

Figure 2:
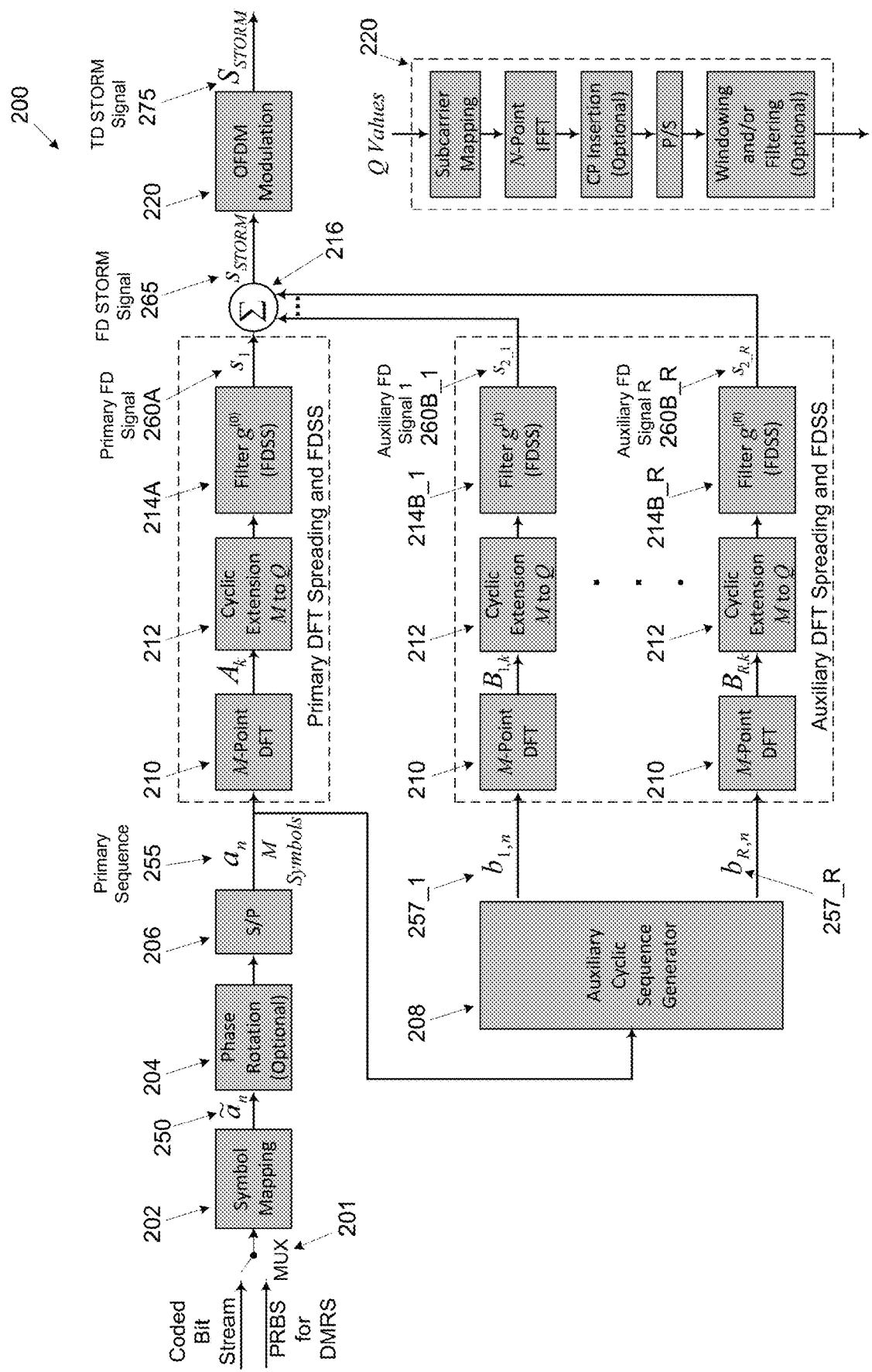
FIG. 2 is a block diagram of a transmitter process for creating a SynThesis Of a neaR-constant Modulus (STORM) signal.

Reference is now made to FIG. 2 which is a block diagram of a transmitter process for creating a low-PAPR STORM signal. A process 200 for creating a STORM signal using a plurality of auxiliary signals may be executed by a processor such as the processor(s) 110 of a transmitter such as the transmitter 102 transmitting an output signal to a receiver such as the receiver 104 in a system such as the system 100.

The process 200 presents a Frequency Domain (FD) implementation for generating the baseband part of an SC-FDM-based STORM waveform, in particular as a superposition of several shaped DFT-s-OFDM waveforms. However, the process 200 may be straightforwardly extended to other waveform variants, where the CP is replaced by another kind of GI, for example, a UW, or two pure SC-based waveforms where pulse shaping is performed in the Time Domain (TD) and the operations of DFT-spreading followed by OFDM modulation are completely avoided.

The process 200 starts with the processor(s) 110 receiving a coded bit stream that is to be transmitted and applying a symbol mapping 202 (modulation) to map the coded bit stream onto a sequence of modulated symbols $\{\tilde{a}_n\}$ 250, where n is an integer index. The symbol mapping 202 may be done using a plurality of modulation schemes, for example, BPSK, QPSK, 8PSK, higher order PSK, QAM and/or the like.

In order to increase the detection performance at the receiver 104, where the signal is received after passing through an unknown medium (channel), the transmitter 102 may transmit one or more DMRS, carrying predefined (known to both transmitter 102 and receiver 104) pilot symbols, in addition to the data carrying signal. The DMRS may be used for a plurality of purposes, for example, CE purposes at the receiver 104 as well as for supervisory and/or control equalization, continuity, synchronization and/or the like of the radio link and/or the signal transmission. In order to maintain the low PAPR property throughout the transmission of the output signal, the processor(s) 100 may apply the same process 200 for the DMRS bit stream as applied to the coded bit stream. Therefore, to inject the DMRS bit stream into the transmitted data stream, the processor(s) 110 may operate a multiplexer (MUX) 201 to select the input bit stream from the coded bit stream or from the DMRS bit stream. The DMRS bit stream may be constructed using one or more Pseudo-Random Binary Sequences (PRBS) which is a binary sequence that may be generated with a deterministic algorithm while exhibiting a statistical behavior similar to a random sequence.

In order to further reduce the PAPR and consequently reduce the OBO of the PA(s) 114, one or more techniques, methods and/or processes as known in the art may be applied to the process 200, for example, phase rotation 204 by a fraction of π between consecutive symbols, for example, rotation of $$\frac{\pi}{2}$$

for BPSK and/or $$\frac{\pi}{4}$$

for QPSK, etc. Additionally and/or alternatively, the PAPR may be reduced using one or more other techniques, methods and/or processes as known in the art, for example, apply spectral shaping to the SC-FDM waveform, where some tradeoff may be made to sacrifice (increase) some BW to achieve reduced PAPR. The flexibility in configuring the symbol mapping 202 and the phase rotation 204 may allow adaptation of the modulation scheme implementation parameter to adapt the STORM implementation as required.

The processor(s) 110 may apply a serial to parallel conversion S/P 206 to the sequence {ã$_n$} 250, to produce at each step of the conversion operation a primary sequence of M symbols {a$_n$} 255 (n=0,1, . . . , M−1), to allow efficient block-wise processing by the processor(s) 110. Each primary symbol sequence {a$_n$} 255, treated as a cyclic block of M symbols (unless stated otherwise), undergoes the same steps of further processing as described in the sequel, to produce a segment of the STORM waveform comprising a single OFDM symbol.

The processor(s) 110 applies an M-Point DFT 210 (M is assumed even) to the primary sequence {a$_n$} 255 to create a FD sequence of symbols {A$_k$} (k=0,1, . . . , M−1), followed by cyclic extension 212 applied to the FD primary sequence {A$_k$}. The processor(s) 110 may then spectrally shape the resulting FD sequence {A'$_k$} (k=0,1, . . . , Q−1, with Q≥M and satisfying ∀k, A'$_k$=A$_{k(modM)}$) using an FDSS filter g$^{(0)}$ 214A to produce the primary FD signal s$_1$ 260A (whose k-th spectral component is equal to the product of A'$_k$ by the k-th filter tap coefficient g$_k^{(0)}$). The choice and configurability of the (tap coefficients of the) FDSS filter g$^{(0)}$ 214A may allow adaptation of the STORM implementation to specific use cases and scenarios.

In addition (possibly in parallel) to producing the primary FD signal s$_1$ 260A, the processor(s) 110 may apply an auxiliary cyclic sequence generator 208 to the primary sequence {a$_n$} 255 to create a plurality of auxiliary sequences {b$_{r,n}$} 257 (r=1,2, . . . , R; n=0,1, . . . , M−1) such as {b$_{1,n}$} 257_1 through {b$_{R,n}$} 257_R. The auxiliary cyclic sequence generator 208 may produce each of the auxiliary sequences {b$_{1,n}$} 257_1 through {b$_{R,n}$} 257_R depending in a specific manner on the symbols of the primary sequence {a$_n$}. The number and type of the auxiliary sequences 257 created in the auxiliary cyclic sequence generator 208 may allow adaptation of the STORM implementation as described herein above.

The processor(s) 110 may apply similar processing to the auxiliary sequences {b$_{1,n}$} 257_1 through {b$_{R,n}$} 257_R as done for the primary sequence {a$_n$} 255. The processor(s) 110 may apply the M-Point DFT 210 to each of the auxiliary sequences {b$_{1,n}$} 257_1 through {b$_{R,n}$} 257_R to create a plurality of FD auxiliary sequences {B$_{1,k}$} through {B$_{R,k}$}, respectively. The processor(s) 110 may apply the cyclic extension 212 to each of the FD auxiliary sequences {B$_{1,k}$} through {B$_{R,k}$}. The processor(s) 110 may then spectrally shape the resulting cyclically extended FD auxiliary sequences using respective filters, namely FDSS filter g$^{(1)}$ 214B_1 through FDSS filter g$^{(R)}$ 214B_R, to generate a plurality of auxiliary FD signals s$_{2\_r}$ (r=1,2, . . . , R) 260B such as signals s$_{2\_1}$ 260B_1 through s$_{2\_R}$ 260B_R, respectively. The STORM auxiliary FDSS filters g$^{(r)}$ 214B_r may depend in a specific manner on the choice of the primary FDSS filter g$^{(0)}$ 214A.

The processor(s) 110 joins (combines), for example, through summation and/or superposition operation 216 the primary FD signal s$_1$ 260A with the plurality of auxiliary FD signals s$_{2\_1}$ 260B_1 through s$_{2\_R}$ 260B_R to create an FD STORM output signal s$_{STORM}$ 265, which may then be processed by an OFDM modulation 220 to generate a Time Domain (TD) STORM output signal S$_{STORM}$ 275. The TD STORM output signal S$_{STORM}$ 275 may be up-converted to the carrier Radio Frequency (RF) and then driven to one or more PAs such as the PA 114 before being transmitted over a wireless channel. The OFDM modulation 220, which is commonly used in any OFDM-based transmitter, comprises several components. In the context of the process 200 under consideration, the processor(s) 110 first maps the spectral components of the FD STORM output signal s$_{STORM}$ 265 onto a plurality of input bins (associated with OFDM subcarriers) of the IFFT of size N to convert the FD STORM output signal s$_{STORM}$ 265 to time domain. Following the IFFT operation, the processor(s) 110 may apply CP insertion to the IFFT output samples, in order to facilitate performing FDE at the receiver. During the CP insertion the processor(s) 110 may insert a one or more GI between the resulting OFDM symbols in order to reduce the ISI in the generated signal. The GI may include for example, a CP, a UW, a cyclic postfix, a ZP, a Zero Tail (ZT) and/or the like. Next, using a Parallel to Serial ( ) converter, the processor(s) 110 serializes the block of resulting samples to generate a waveform segment comprising a single OFDM symbol, and the processor(s) 110 further optionally applies a TD window-and-overlap and/or filtering operation in order to smoothly tailor the samples of consecutively concatenated OFDM symbols so as to produce the final TD STORM baseband signal S$_{STORM}$ 275, ensuring a desired level of its spectral containment characteristics.

Formally, in the SC-FDM-based framework, the TD STORM output (baseband) signal S$_{STORM}$ 275 may be expressed (in continuous time representation) by equation 1 below. Equation 1 applies to a time interval encompassing a single M-tone OFDM symbol of duration T̃=MT, and a CP-type guard interval of duration T$_g$.

$$s_{STORM}(t) = \underbrace{\sum_{n=0}^{M-1} a_n \phi(t-nT)}_{\text{Primary (info bearing) signal}} + \underbrace{\sum_{r=1}^{R} \sum_{n=0}^{M-1} b_{r,n} \varphi_r(t-nT)}_{\text{Sum of Auxiliary components}}, \quad \text{Equation 1}$$

$$-T_g < t \leq \tilde{T}$$

The relation between the pulse shaping functions ϕ(t), φ$_r$(t) introduced in equation 1 and the FDSS filters g$^{(i)}$ 214 discussed above is explained in more detail herein after with respect to equation 13.

In the basic binary mode, referred to as B-STORM, the primary data sequence {a$_n$} 255 and the auxiliary sequences {b$_{r,n}$} 257 are pi/2-BPSK symbol streams, which may be expressed as a$_n$=j$^n$ã$_n$, b$_{r,n}$=j$^{n+\beta_r}$b̃$_{r,n}$ respectively, with ã$_n$, b̃$_{r,n}$∈{±1} for all n=0,1, . . . , M−1 and β$_r$∈{0,1} for any r=1,2, . . . , 2$^\Lambda$−1. Where Λ is a natural number (Λ≥1) whose value depends on the finite TD time support (period, duration and/or the like) of the primary pulse ϕ(t) in units of T, as detailed hereinafter, for example, such that Λ+2 is the smallest integer larger than the duration of the time support of ϕ(t) in units of T.

In practice, some (typically all but one) of the R≤2$^\Lambda$−1 auxiliary components in the sum over r in equation 1 are neglected, while keeping, as part of the tradeoff between complexity and PAPR performance, only few auxiliary signals having non-negligible pulse energy ∫|φ$_r$(t)|$^2$dt with respect to the primary pulse energy ∫|ϕ(t)|$^2$dt.

The dependence between the auxiliary sequence symbols b$_{r,n}$ 257 and the symbols of the primary sequence a$_n$, is carefully defined. For the B-STORM implementation, for which we annotate the relevant variables by the superscript (B), this dependence may be expressed by equation 2 below.

$$b_{r,n}^{(B)} = a_n \prod_{\substack{m=1 \\ d_{r,m} \neq 0}}^{\Lambda} \frac{a_{(n-m-1) \bmod M}}{a_{(n-m) \bmod M}},$$ Equation 2 where $r = \sum_{m=1}^{\Lambda} 2^{m-1} d_{r,m}, \, d_{r,m} \in \{0, 1\}$

The dependence between the pulse shapes $\varphi_r(t)$ used to create the auxiliary FD signals $s_{2\_r}$ 260B and the pulse shape $\phi(t)$ used to create the primary FD signal $s_1$ 260A are carefully defined and/or selected. For the B-STORM implementation, this dependence may be expressed by equation 3 below.

$$\varphi_r^{(B)}t = \begin{cases} \phi(t) \prod_{m=1}^{\Lambda} \frac{\phi(t+(m+1)T)}{\phi(t+mT)} & \text{if } \prod_{m=1}^{\Lambda} \phi(t+mT) \neq 0 \\ \lim_{\tau \to t} \phi(\tau) \prod_{\substack{m=1 \\ d_{r,m} \neq 0}}^{\Lambda} \frac{\phi(\tau+(m+1)T)}{\phi(\tau+mT)} & \text{if } \left\{ \begin{array}{l} -(\Lambda+1)T < t < -\mu_r^{(B)}T \\ \text{and } \prod_{\substack{m=1 \\ d_{r,m} \neq 0}}^{\Lambda} \phi(t+mT) = 0 \end{array} \right\} \\ 0 & \text{if } t \leq -(\Lambda+1)T \text{ or } t \geq -\mu_r^{(B)}T \end{cases}$$

Equation 3

In equation 3, it is assumed that the duration of the primary pulse $\phi(t)$ is less than or equal to $(\Lambda+2)T$, and, without loss of generality, that $\phi(t)$ quickly decays outside the interval $(-(\Lambda+1)T, T)$. The specific choice of starting point of the latter interval of support, on the grid of integer multiples of T along the time axis, is a matter of convention which should not be regarded as an essential ingredient of the STORM technique and/or any of its embodiments. The starting point may be arbitrarily shifted in time with the relations between the primary and auxiliary pulse shapes modified accordingly, in an obvious manner, for example, as presented in equation 3. As evident from the definition in equation 2, $d_{r,m}$ stands for the m-th bit value in the (length-$\Lambda$) binary representation of the index r of the relevant auxiliary signal component, and $\mu_r^{(B)}$ is defined in turn via $$\mu_r^{(B)} = \max_{\substack{1 \leq m \leq \Lambda \\ d_{r,m} \neq 0}} m.$$

Hence, in particular $\mu_1 = 1$, and therefore the support of the dominant auxiliary pulse $\varphi_1^{(B)}(t)$ is restricted to the interval $(-(\Lambda+1)T, -T)$, which is shorter by 2T than the support of the primary pulse $\phi(t)$.

For simplicity of the design and implementation, it is further assumed that $\forall t, \phi(t) \geq 0$ such that the need for the limiting procedure (on the right hand side of the second line of equation 3 for the expression for $\varphi_r^{(B)}(t)$) may be avoided.

A shorthand notation $\phi_m$ is introduced, as expressed in equation 4 below, for the primary pulse $\phi(t)$ shifted in time (into the past) by the duration mT.

$$\forall m \in Z, \, \phi_m(t) := \phi(t+mT) \qquad \text{Equation 4:}$$

Using this notation, the first few auxiliary pulses may be expressed succinctly (within their support region) as shown in equation 5 below.

$$\varphi_1^{(B)} = \frac{\phi_0 \phi_2}{\phi_1}, \, \varphi_2^{(B)} = \frac{\phi_0 \phi_3}{\phi_2}, \, \varphi_3^{(B)} = \frac{\phi_0 \phi_3}{\phi_1},$$ Equation 5

$$\varphi_4^{(B)} = \frac{\phi_0 \phi_4}{\phi_3}, \, \varphi_5^{(B)} = \frac{\phi_0 \phi_2 \phi_4}{\phi_1 \phi_3}, \, \varphi_6^{(B)} = \frac{\phi_0 \phi_4}{\phi_2}, K$$

When using certain (families of) primary pulse shapes $\phi(t)$, the inclusion of a whole (finite) set of auxiliary signals $\varphi_r^{(B)}(t)$ in the combined TD B-STORM waveform $S_{STORM}^{(B)}$ 275 ensures it approaches a Continuous Phase Modulation (CPM) signal, implying a strictly constant modulus (envelope amplitude). More generally, even for less restricted primary pulse shapes $\phi(t)$, it may be proved that for any $n=0,1,\ldots,M-1$, the TD B-STORM output signal $S_{STORM}^{(B)}$ 275 in the binary mode follows the expression of equation 6 below.

$$s_{STORM}^{(B)}(t = nT + \tau) = \frac{\prod_{m=0}^{\Lambda}(a_{(n+m) \bmod M})\phi(\tau-mT) + a_{(n+m+1) \bmod M}\phi(\tau-(m+1)T)}{\prod_{m=1}^{\Lambda} a_{(n+m) \bmod M}\phi(\tau-mT)} =$$

$$a_n \phi(\tau) \prod_{m=0}^{\Lambda}\left(1 + \frac{a_{(n+m+1) \bmod M}}{a_{(n+m) \bmod M}} \frac{\phi(\tau-(m+1)T)}{\phi(\tau-mT)}\right),$$

$$0 \leq \tau < T$$

Equation 6

The TD B-STORM output signal $S_{STORM}^{(B)}$ 275, by virtue of the orthogonality relations $|a_n|^2 = 1$, $\mathrm{Re}(a_n^* \cdot a_{(n+1) \bmod M}) = 0$ and the assumed reality of $\phi(t)$, may exhibit a periodic modulus behavior (with period T) which is strictly independent of the data $a_n$, as expressed in equation 7 below (the notation $\lfloor x \rfloor$ appearing therein, and elsewhere below, is used to denote the largest integer not greater than the argument x).

$$|s_{STORM}^{(B)}(t)|^2 = \phi^2(\tau) \prod_{m=0}^{\Lambda} \prod_{\delta \in \{\pm 1\}} \left(1 + e^{j\pi\delta/2} \frac{\phi(\tau-(m+1)T)}{\phi(\tau-mT)}\right),$$ Equation 7 where $\tau = t - \left\lfloor \frac{t}{T} \right\rfloor T, \, 0 \leq t < MT.$

Continuity of the modulus may be ensured under a further assumption of the continuity of $\phi(t)$ and the symmetry property $\forall t, \phi(-\frac{1}{2}\Lambda T - t) = \phi(-\frac{1}{2}\Lambda T + t)$.

As mentioned above, the primary pulse shape $\phi(t)$ can be selected such that the expression in equation 7 is in fact constant, namely independent of $\tau$ (and hence also of t), which is advantageous with respect to the PAPR. However, in such cases the auxiliary pulse shapes $\varphi_r^{(B)}(t)$ may turn out to be different from each other and from the primary pulse shape $\phi(t)$ by more than just simple alterations of gain and/or time shifts, thus requiring relatively complicated construction and usage procedures.

The analogous formalism for the quaternary mode, designated as Q-STORM, is slightly more complex. In Q-STORM, the primary data sequence $\{a_n\}$ 255 is a pi/4-rotated QPSK symbol stream, which may be expressed as $a_n = e^{j\pi\alpha_n/4}$ where $\alpha_n \in \mathbb{Z}$, $\alpha_n \equiv n+1 \pmod{2}$, and the auxiliary data sequences $\{b_{r,n}\}$ 257 are complex-valued symbol streams which may be expressed by equation 8 below.

$$b_{0,n}^{(Q)} = a_n;\ b_{1,n}^{(Q)} = \frac{a_n + a_{(n-1) \bmod M}}{|a_n + a_{(n-1) \bmod M}|}|a_n - a_{(n-1) \bmod M}| \quad \text{Equation 8}$$

$$\forall r = 2, 3K, 2 \cdot 3^\Lambda - 1,$$

$$b_{r,n}^{(Q)} = b_{r \bmod 2,n}^{(Q)} \prod_{\substack{m=1 \\ c_{\lfloor r/2 \rfloor, m} = 1}}^{\Lambda} \frac{b_{1,(n-m) \bmod M}^{(Q)}}{b_{0,(n-m) \bmod M}^{(Q)}} \prod_{\substack{m=1 \\ c_{\lfloor r/2 \rfloor, m} = 2}}^{\Lambda} \frac{b_{0,(n-m-1) \bmod M}^{(Q)}}{b_{0,(n-m) \bmod M}^{(Q)}},$$

where $\forall \rho = 1, 2, K, 3^\Lambda - 1$, $$\rho = \sum_{m=1}^{\Lambda} 3^{m-1} c_{\rho,m},\ c_{\rho,m} \in \{0, 1, 2\}.$$

In the Q-STORM mode, $\Lambda$ may be selected as any non-negative integer, namely $\Lambda \geq 0$. Assuming (as for the B-STORM signal) a non-negative real primary pulse shape $\phi(t)$ with time support bounded inside the interval $(-(\Lambda+1)T, T)$, the auxiliary pulse shaping functions may be generated according to equation 9 below.

$$\varphi_0^{(Q)}(t) = \phi(t);\ \varphi_1^{(Q)}(t) = \sqrt{\phi(t)\phi(t+T)} \quad \text{Equation 9}$$

$$\forall r = 2, 3, K, 2 \cdot 3^\Lambda - 1,$$

$$\varphi_r^{(Q)}(t) =$$

$$\begin{cases} \varphi_{r \bmod 2}^{(Q)}(t) \prod_{\substack{m=1 \\ c_{\lfloor r/2 \rfloor, m} = 1}}^{\Lambda} \frac{\varphi_1^{(Q)}(t+mT)}{\varphi_0^{(Q)}(t+mT)} \prod_{\substack{m=1 \\ c_{\lfloor r/2 \rfloor, m} = 1}}^{\Lambda} \frac{\varphi_0^{(Q)}(t+(m+1)T)}{\varphi_0^{(Q)}(t+mT)} & \text{if} \\ \prod_{\substack{m=1 \\ c_{\lfloor r/2 \rfloor, m} \neq 0}}^{\Lambda} \varphi_0^{(Q)}(t+mT) \neq 0 \\ 0 & \text{otherwise} \end{cases}$$

As for the primary pulse shape $\phi(t)$, the time support of the primary pulse shape $\varphi_r^{(Q)}(t)$ is bounded by the interval $(-(\Lambda+1)T, -\mu_r^{(Q)}T)$, where $$\mu_1^{(Q)} = 0 \text{ and } \mu_r^{(Q)} = \max_{\substack{1 \leq m \leq \Lambda \\ c_{\lfloor r/2 \rfloor, m} \neq 0}} m \text{ for } r > 1.$$

Using the notation of equation 4, the first few auxiliary pulses may be expressed by equation 10 below, in analogy to equation 5 in the binary mode.

$$\varphi_1^{(Q)} = \sqrt{\phi_0 \phi_1},\ \varphi_2^{(Q)} = \phi_0 \sqrt{\frac{\phi_2}{\phi_1}},\ \varphi_3^{(Q)} = \sqrt{\phi_0 \phi_2}, \quad \text{Equation 10}$$

$$\varphi_4^{(Q)} = \frac{\phi_0 \phi_2}{\phi_1},\ \varphi_5^{(Q)} = \sqrt{\frac{\phi_0}{\phi_1}} \phi_2, K$$

When including all $2 \cdot 3^\Lambda - 1$ auxiliary components in the Q-STORM signal, it may be shown that the resulting waveform modulus (complex absolute value) exhibits a periodic data-independent behavior. Specifically, for any $n = 0, 1, \ldots, M-1$, the TD Q-STORM output signal $S_{STORM}^{(Q)}$ 275 in the quaternary mode follows the expression of equation 11 below.

$$s_{STORM}^{(Q)}(t = nT + \tau) = \quad \text{Equation 11}$$

$$a_n \phi(\tau) \cdot \prod_{m=0}^{\Lambda} \left(1 + \frac{b_{1(n+m+1) \bmod M}^{(Q)}}{a_{(n+m) \bmod M}} \sqrt{\frac{\phi(\tau-(m+1)T)}{\phi(\tau-mT)}} + \frac{a_{(n+m+1) \bmod M}}{a_{(n+m) \bmod M}} \frac{\phi(\tau-(m+1)T)}{\phi(\tau-mT)}\right),\ 0 \leq \tau < T$$

The TD Q-STORM output signal $S_{STORM}^{(Q)}$ 275, by virtue of the orthogonality relations $$|a_n|^2 = 1,\ |\text{Im}(a_n^* \cdot a_{(n+1) \bmod M})| = \frac{1}{\sqrt{2}}$$

satisfied by the elements of the pi/4-QPSK symbol sequence $\{a_n\}$, may lead to periodic modulus behavior which is strictly independent of the data $a_n$, as expressed in equation 12 below.

$$\left|s_{STORM}^{(Q)}(t)\right|^2 = \quad \text{Equation 12}$$

$$\phi^2(\tau) \prod_{m=0}^{\Lambda} \prod_{\delta \in \{\pm 1, \pm 3\}} \left(1 + e^{j\pi\delta/4} \sqrt{\frac{\phi(\tau-(m+1)T)}{\phi(\tau-mT)}}\right),$$

where $\tau = t - \left\lfloor \frac{t}{T} \right\rfloor T,\ 0 \leq t < MT$.

Neglecting some of the auxiliary components, namely setting $R < 2 \cdot 3^\Lambda - 1$ in Equation 1 may degrade this strict intricate data-independence property. However, certain selections of the primary pulse shapes $\phi(t)$ may still yield a near-constant modulus Q-STORM signal with a very low PAPR.

As described in process 200, the TD primary pulse shapes $\phi(t)$ and the auxiliary pulse shapes $\varphi_r(t)$ may be constructed (realized) using the FDSS filters $g^{(0)}$ 214A and $g^{(r)}$ 214B_r (r=1,2, ..., R), respectively. The relations between the TD pulse shaping functions and the FDSS filters are expressed in equation 13 below.

$$\phi(t) = \sum_{k=0}^{Q-1} g_k^{(0)} e^{j\frac{2\pi}{MT}kt};\ \varphi_r(t) = \sum_{k=0}^{Q-1} g_k^{(r)} e^{j\frac{2\pi}{MT}kt}, \quad \text{Equation 13}$$

$$r = 1, 2, K, R$$

In equation 13, k is the frequency subcarrier index, r=0 corresponds to the primary signal, and it should be noted again that in practice only a few auxiliary components r>0 may need to be used. The parameter Q is selected from the range M, M+1, . . . , N where M and N are the sizes of the DFT 210 and of the IFFT (sub-block of the OFDM Modulation 220), respectively, of the DFT-s-OFDM scheme. The parameter Q controls the accuracy to which the relations in equation 13 are satisfied, as well as the spectral confinement of the primary and auxiliary components, and therefore presents another degree of freedom of the design allowing adaptation of the waveform to be transmitted to the link scenario, spectral requirements and/or regulations.

As shown in the process 200, through summation and/or superposition operation 216, the processor(s) 110 joins (combines) the primary FD signal $s_1$ 260A coming out of the FDSS filter $g^{(0)}$ 214A and the auxiliary FD signals $s_{2\_r}$ 260B_r coming out of the FDSS filters $g^{(r)}$ 214B_r to form the FD STORM output signal $s_{STORM}$ 265. Each of the FD signal $s_1$ 260A and the auxiliary FD signals $s_{2\_r}$ 260B_r are expressed as vectors of Q values and the joining operation 216, for example, the summation, results in a combined vector of Q values which are driven into the OFDM modulation block 220. In the first processing stage of the OFDM modulation, i.e. the mapping to the subcarriers, the Q values are mapped onto the subcarriers with spacing of $$\Delta f = \frac{1}{\tilde{T}} = (MT)^{-1}$$

between one another, specifically on Q contiguous bins at the input of the N-point IFFT block.

Regarding the architecture of the receiver 104, a straightforward implementation of the STORM receiver may be a generalization of a plain SC-FDM receiver.

In the B-STORM case, it may be demonstrated that a careful selection of the primary pulse/spectral shaping $\phi(t)$ (optimizing the overall link gains) may lead to inclusion of only a very weak single auxiliary signal (weaker by more than ~15 dB than the primary signal) in the waveform. Therefore, the simplest approach, incurring a minor and negligible penalty in detection performance, is to ignore at the receiver 104 the existence of the auxiliary signal in the to be transmitted TD STORM signal $S_{STORM}^{(B)}$ 275.

Furthermore, the controlled ISI introduced by the primary pulse shape $\phi(t)$ is of short range, and which may affect non-marginally only the nearest-neighbor symbols, which are I/Q-orthogonal (by virtue of the pi/2-BPSK modulation). This implies that the ISI may also be neglected at the receiver 104 with negligible performance degradation.

It should be noted that relative detection losses due to ignoring the auxiliary signal and to neglecting the ISI are typically small and insignificant, since the typical range of required receiver Signal to Noise Ratio (SNR) is low, at the Spectral efficiency (SE) regime achievable (covered) by the B-STORM.

Figure 3A:
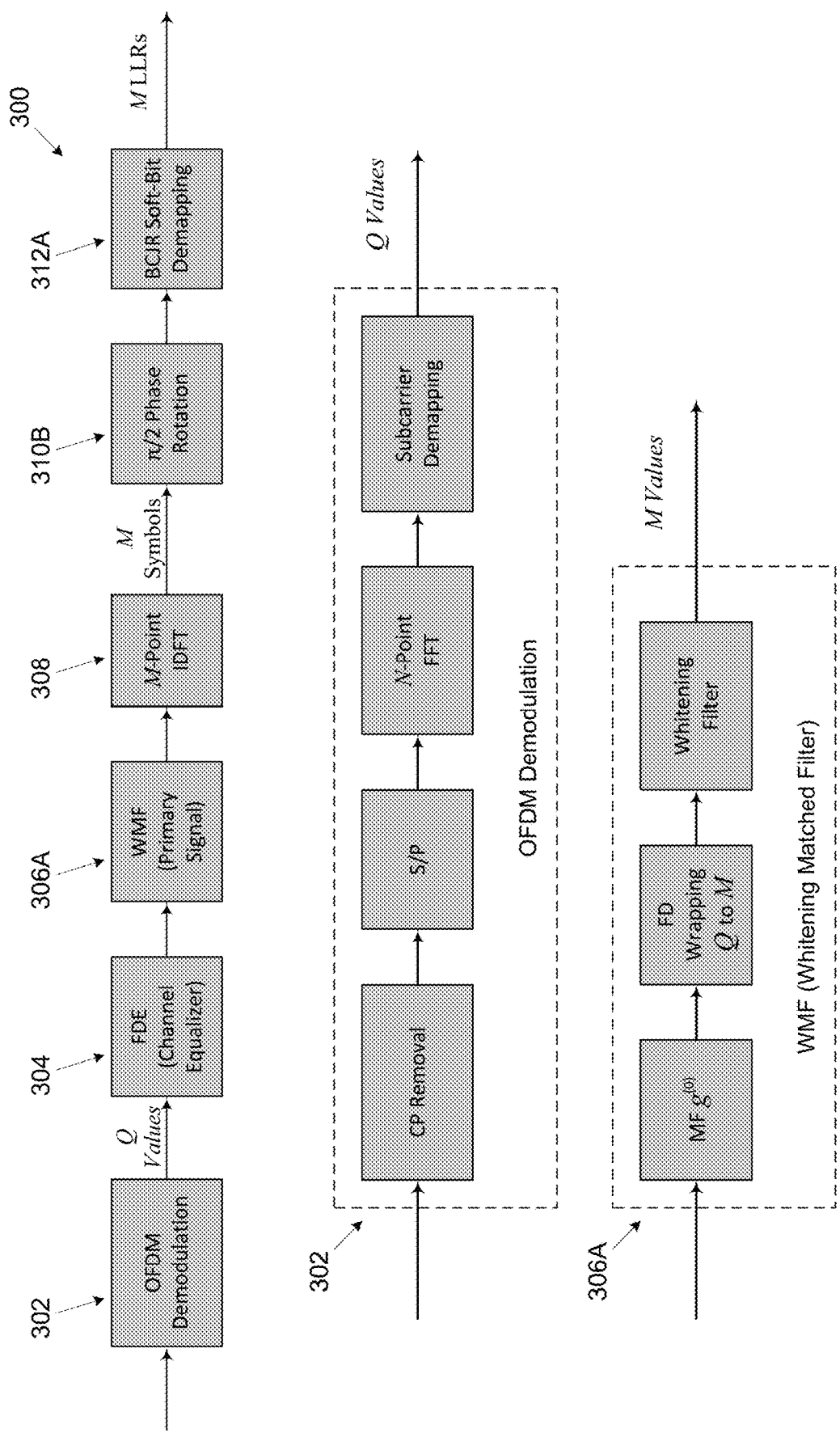
FIG. 3A and FIG. 3B are block diagrams of receiver processes for extracting data from a received Binary-mode STORM (B-STORM) signal.
Figure 3B:
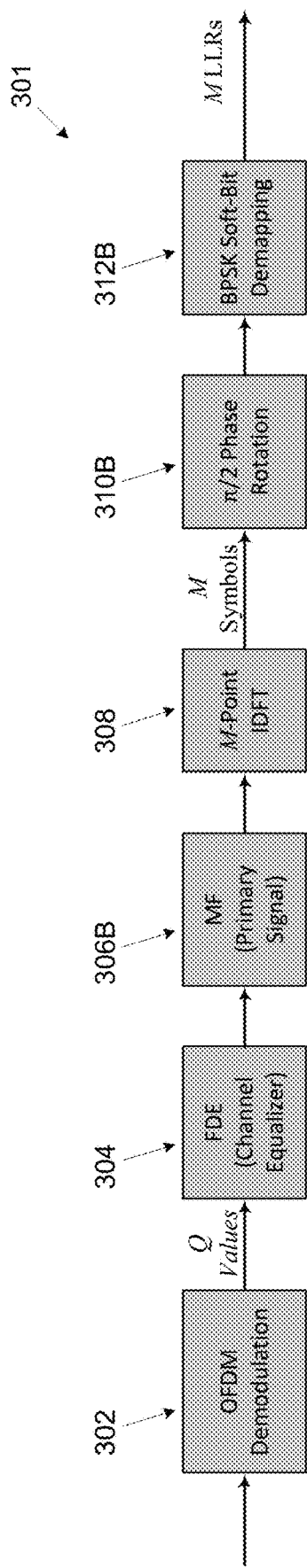

Reference is now made to FIG. 3A and FIG. 3B which are block diagrams of receiver processes for extracting data from a received B-STORM signal. A reception process 300 may be applied by a B-STORM receiver such as the receiver 104 to demodulate a B-STORM signal $S_{STORM}^{(B)}$ such as the TD STORM output signal $S_{STORM}$ 275 received from a transmitter such as the transmitter 102 after propagation through a wireless channel. The process 300 may be significantly simplified by processing only the primary signal component of the B-STORM signal $S_{STORM}^{(B)}$ while ignoring the auxiliary signal component(s), an approach which has been demonstrated to incur only an insignificant degradation in the detection performance in the binary mode.

The reception process 300, which may be based on a standard SC-FDM receiver implementation, starts with a processor such as the processor(s) 120 applying an OFDM demodulation 302 to the received B-STORM signal $S_{STORM}^{(B)}$. The OFDM demodulation 302 typically includes removing the CP from the signal (if inserted by the transmitter), converting the signal into a parallel stream to allow for efficient block-wise processing by the processor(s) 120, applying an N-Point FFT to convert the signal to the frequency domain (FD), and then de-mapping the subcarriers to extract the Q values which carry the desired information to be detected.

In the following step, the processor(s) 120 may apply Frequency Domain Equalization (FDE) 304 to the signal converted to the frequency domain (the FDE may employ channel estimates, not shown in FIG. 3A, for the per-subcarrier equalization operation it carries out). Next, the processor(s) 120 may apply a Whitening Matched Filter (WMF) 306A to undo the manipulations of M→Q cyclic extension and FDSS filtering $g^{(0)}$ (which were applied onto the FD primary component while generating the B-STORM signal in a process such as process 200 at the transmitter) while taking care not to introduce any extra correlations between the additive noise components in the M output values of the WMF. The WMF 306A may apply to the Q values $Y_k$ (k=0,1, . . . , Q-1) of the FD equalized signal a Matched Filter (MF) with the conjugate filter tap coefficients $g_k^{(0)}$ to yield the values $X_k' = g_k^{(0)} \cdot Y_k$, followed by a Frequency Domain wrapper to undo the cyclic extension via $X_k = \Sigma_{l=k(mod M)} X_l'$ (k=0,1, . . . , M-1), and finally a Whitening Filter to ensure that an additive white noise at the input to the WMF 306A remains white also at its output, while at the same time minimizing the length of the resulting effective channel (in order not to increase the required complexity of the BCJR (Bahl, Cocke, Jelinek, Raviv algorithm) Soft-Bit Demapping block 312A down the processing chain). Following the WMF 306A, the processor(s) 120 may apply an M-Point IDFT 308 to convert the signal back to the time domain and obtain the demodulated pi/2-rotated symbols. The processor(s) 120 may then apply a pi/2 phase rotation 310B to extract the un-rotated symbols and finally, the processor(s) 120 may apply a BCJR Soft-Bit Demapping 312A to generate the per-bit Log-Likelihood Ratios (LLR) to be fed into a decoder (not shown in FIG. 3A) for completing the process of detection of the transmitted data bit stream.

A further simplified variant of the B-STORM receiver 104, which targets processing only of the primary signal component, may be obtained by instructing the B-STORM receiver 104 to execute a process 301 as shown in FIG. 3B. In the process 301, the WMF 306A employed in the process 300 may be degenerated into a primary MF (avoiding the application of the Whitening Filter in 306A), while replacing the BCJR Soft-Bit Demapping 312A by a standard BPSK LLR generator 312B.

The Q-STORM scheme aims at enabling data transfer at higher SE than that of B-STORM. However, the advantage of the Q-STORM may come at the cost of requiring the inclusion in the STORM waveform of one or more auxiliary signal components, which cannot be ignored at the receiver since their power may not be significantly lower relative to that of the primary signal, typically only ~4 dB below the power of the primary signal.

Thus in a Q-STORM receiver such as the receiver 104, the auxiliary signal component(s) may not be ignored without significantly degrading the detection performance. Furthermore, even though the ISI introduced by the primary pulse shape may be of short range, consecutive pi/4-QPSK symbols are not I/Q-orthogonal and hence the resulting ISI may not be neglected at the receiver 104 in the quaternary mode.

Figure 4:
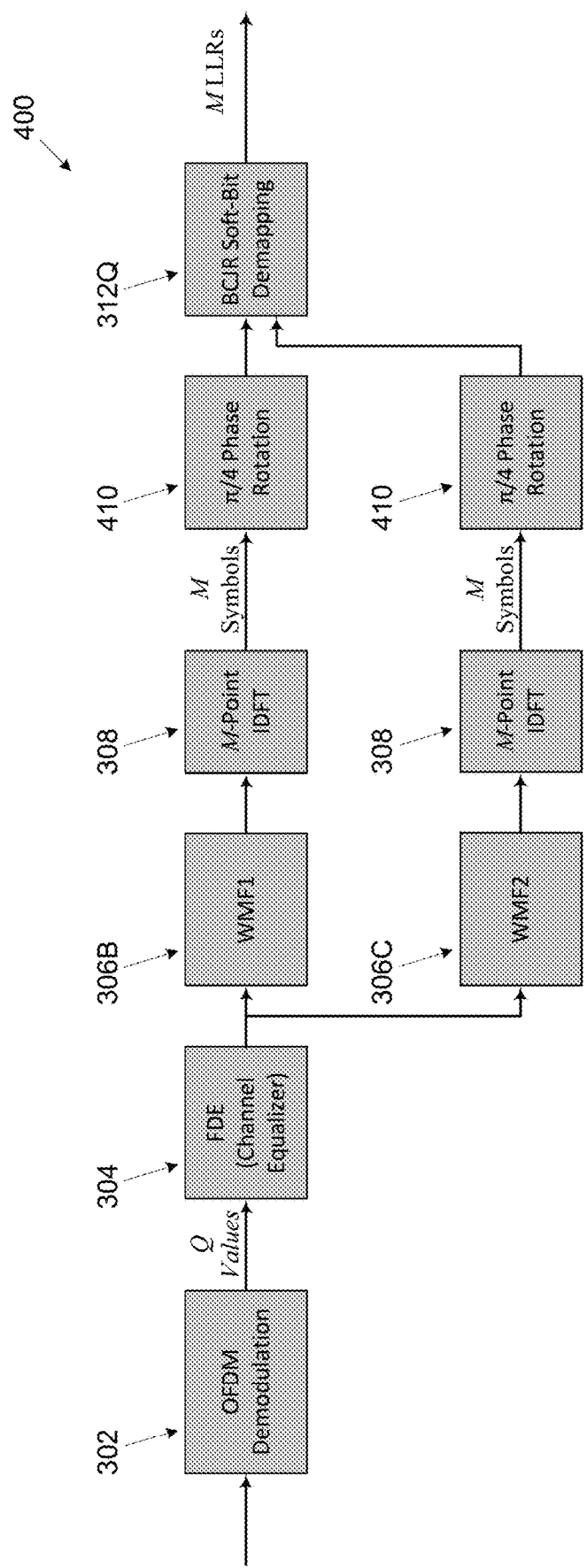
FIG. 4 is a block diagram of a receiver process for extracting data from a received Quaternary-mode STORM (Q-STORM) signal.

Reference is now made to FIG. 4 which is a block diagram of a receiver process for extracting data from a received Quaternary-mode STORM (Q-STORM) signal, generalizing the approach outlined in FIG. 3A (which is applicable in the B-STORM mode when the receiver targets only the primary signal component) to the case where the receiver attempts to handle a single (dominant) auxiliary signal component in addition to the primary. A reception process 400 may be applied by a Q-STORM receiver such as the receiver 104 to demodulate a Q-STORM signal $S_{STORM}^{(Q)}$ such as the TD STORM output signal $S_{STORM}$ 275 received from a transmitter such as the transmitter 102 after propagation through a wireless channel.

Since an auxiliary signal component of the Q-STORM signal $S_{STORM}^{(Q)}$ may not be ignored, the process 302 may apply two WMFs, a WMF1 306B for the primary signal component and a WMF2 306C for the (dominant) auxiliary signal component.

To enable an efficient demodulation process, the WMF1 306B, employing an MF matching an FDSS used by the transmitter (such as the FDSS filter $g^{(0)}$ 214A), may typically be designed so as to exhibit an overall response (including the FDSS $g^{(0)}$ 214A of the transmitter 102) which is casual and of minimal phase. The WMF2 306C, on the other hand, is typically designed using an MF which is orthogonal to the MF of the primary signal (the MF subcomponent of WMF1 306B), followed by an appropriate whitening filter. It may therefore be impossible to achieve an overall response of the WMF2 306C which is both causal and of minimal phase, and hence difficult to minimize the length of the effective channel. A processor such as the processor(s) 120 may feed both outputs of the WMF1 306B and the WMF2 306C, after performing IDFT 308 and appropriate pi/4 phase rotation 410 on each one of the two outputs, into a BCJR Soft-Bit Demapping 312Q to generate LLRs for decoding the data. The BCJR Soft-Bit Demapping 312Q may processes a pair of complex inputs at a time, to yield two LLR outputs (for each one of the two coded bits carried by each transmitted QPSK symbol) at each step, carrying combined information extracted from both the primary signal and the auxiliary signal. The sequence of LLRs is then fed into a channel decoder (not presented in the process 400) for further extraction of the transmitted data bits.

To summarize, the STORM implementation aims to maximize the relative overall link gain, in particular by adapting each specific STORM implementation according to the required performance by adapting one or more of the implementation parameters, for example, the modulation scheme, the pulse/spectral shape $\phi(t)$ of the primary signal, and the number of auxiliary signals used to construct the joint signal.

The relative overall link gain may be defined as follows (in terms of quantities that are further explained henceforth):

Overall link gain [dB]=(Gain in PA output Tx power)−(Rx detection loss).

Here the Gain in PA output Tx power represents the OBO reduction gain, which is the practical translation of the reduced PAPR of the waveform into an increase in the Tx power and hence an increase in the Rx SNR, which may allow range extension of the communication link at a given data rate. The Gain in PA output Tx power may depend on the PA (model) properties as well as the (band-dependent regulatory and specification-related) spectral constraints enforced on the transmitted signal, such as requirements on the EVM, SEM, OOBE & IBE, ACLR, etc.

The Rx detection loss represents the degradation in the receiver's detection performance, e.g., the required Rx SNR for reaching a certain packet error probability at a certain target data rate (or SE). In addition to the target SE, the detection loss depends also on the deployment scenario through the assumed channel (model) and DMRS implementation and/or design which may affect the channel estimation performance at the receiver.

Non-STORM Architecture

There exist other (non-STORM) methods, systems and implementations known in the art for reducing the PAPR.

Figure 5A:
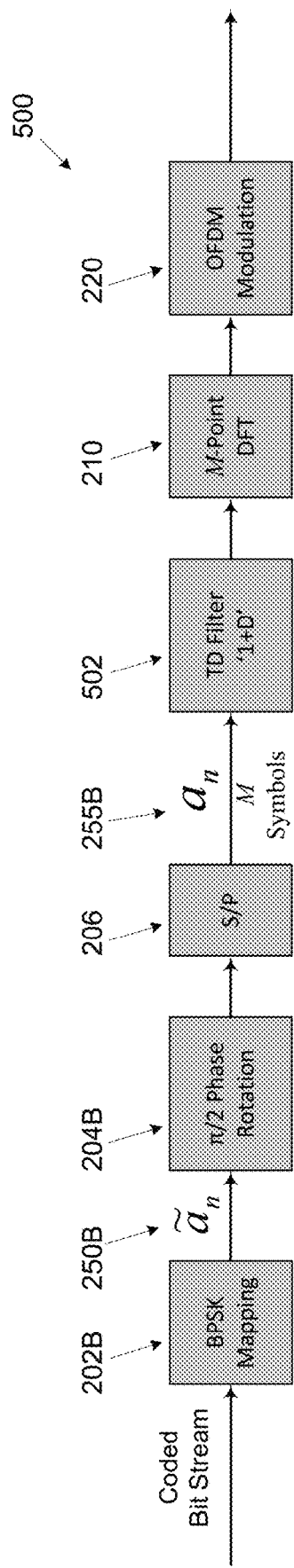
FIG. 5A and FIG. 5B present block diagrams of non-STORM transmitter processes for creating a low-PAPR signal.
Figure 5B:
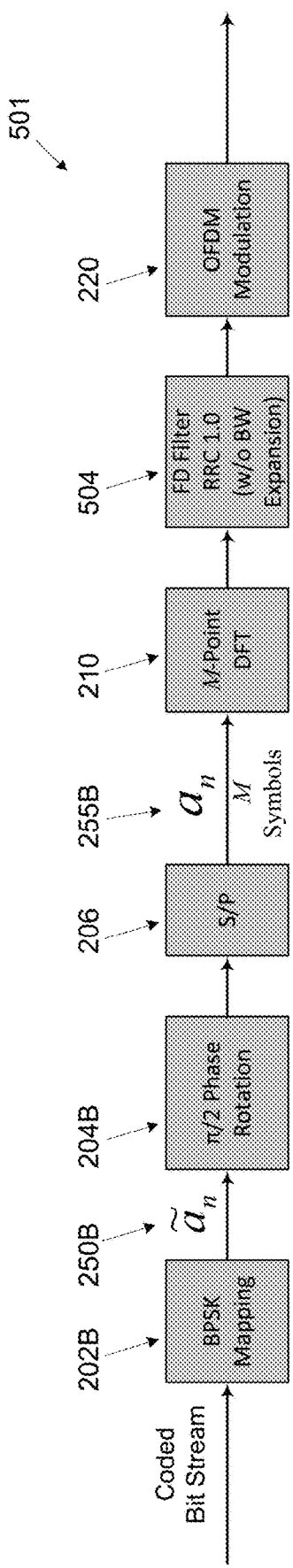

Reference is now made to FIG. 5A and FIG. 5B which presents block diagrams of non-STORM BPSK-based transmitter processes for creating a low-PAPR signal. A process 500, executed by a processor such as the processor(s) 110 of a transmitter such as the transmitter 102, presents a low-PAPR transmission scheme based on DFT-s-OFDM with pi/2-BPSK modulation for creating a low-PAPR transmission signal. The processor(s) 110 may apply a particular shaping function which may be implemented via a "duo-binary" TD filter 502, which may be utilized by a simple '1+D' (pre-DFT) tapped delay line as known in the art, namely which converts the input pi/2-BPSK symbol sequence $\{a_n\}$ 255B into an output sequence $\{\hat{a}_n\}$ whose elements are given by $\hat{a}_n=(a_n+a_{(n-1)modM})/\sqrt{2}$. A process 501 presents an equivalent implementation of the process 500, in which the processor(s) 110 may process the signal in the frequency domain and performs spectral shaping using an FDSS (post-DFT) filter of type (Square-)Root Raised Cosine (RRC) with a roll-off factor 1, such as FD filter 504 in FIG. 5, whose number of taps is M (being equal to the size of the M-point DFT 210). Such an implementation may also be equivalent to an Offset-QPSK (OQPSK) modulation scheme, adapted to the DFT-s-OFDM framework.

The processes 500 and 501 may present significant PAPR reduction compared to the baseline pi/2-BPSK DFT-s-OFDM waveform without any spectral shaping or pre-DFT processing, at the cost of a very simple extra processing step at the transmitter. Moreover, the controlled (1-tap) ISI introduced by the pulse/spectral shaping into the waveform may be insignificant in the case of pi/2-BPSK modulation, and may be easily handled by a receiver such as the receiver 104 using a simple (linear) architecture. However, this method is not readily extendable from the binary mode described above to modulation orders higher than BPSK's, and even in the binary mode B-STORM may achieve better PAPR and OBO performance in various scenarios.

U-STORM Architecture

The STORM architecture in the B-STORM mode, which is based on pi/2-BPSK modulation, targets coverage extension of links operating at the relatively low SE regime of <~2/3 bits/s/Hz. As demonstrated herein above for the B-STORM mode, the design of the transmitter 102 and/or the receiver 104 may be fairly simple due to the fact that the auxiliary signal component(s) are of significantly low power compared to the primary signal. The transmitter 102 may therefore be relatively simple as only few (typically 1) auxiliary signal may be required to generate the low-PAPR signal. The receiver 104 of the B-STORM signal may also maintain a simple design as the auxiliary signal component(s) may be neglected at the receiver 104.

However, extending the STORM implementation to the Q-STORM mode, based on pi/4-QPSK, targeting SE between ~2/3 and ~5/3 bits/s/Hz, may lead to inclusion of non-negligible auxiliary signal components. This may essentially require an increase in the complexity of the transmitter 102, to create a plurality of pulse shapes for the auxiliary signal components, as well as an increase in complexity of the receiver 104, to include additional chains of processing blocks in parallel to the chain handling the primary signal, in order to demodulate the auxiliary signal components.

The present disclosure describes reduced complexity practical implementation of the transmitter 102 and/or the receiver 104 for creating low-PAPR U-STORM signals by selecting a single universal pulse shape for constructing the primary pulse shape $\phi(t)$ while the auxiliary pulse shapes $\phi_r(t)$ are derived from the same universal pulse shape $\phi(t)$ with one or more alterations, for example, attenuation parameter (gain change) and/or a time shift parameter.

The improved STORM implementation is first described for a Gaussian pulse shape for creating G-STORM signals and is later extended to the universal pulse shape implementation for creating the U-STORM signals. The universal pulse shaping implementation may be applicable for a plurality of common pulse shaping, with a reduced number of required DFT and filtering operations, in particular for the Gaussian pulse shape. The resulting overall STORM waveform exhibits low PAPR even with a small number of auxiliary signal components, and in particular supports practical implementations of Q-STORM, extending the advantages of B-STORM to a higher SE regime.

As described herein after, the U-STORM implementation may be adapted according to one or more spectral constraints applicable to the generated U-STORM signal, for example, the Power Spectral Density (PSD) of the U-STORM output signal should be sufficiently "narrow", constrained, for example, by a spectral requirement of Spectral Emission Mask (SEM) and/or Adjacent-Carrier Leakage Ratio (ACLR), after passing through a (non-linear) PA such as the PA 114, with as small OBO as possible. The spectral constraints may be based, for example, on those agreed by 3GPP for the New Radio (NR) Study Item (cf. the TSG RAN WG1 email discussion "[85-18] PA assumption for NR", June 2016), with simple rescaling adaptation required for the PA model class.

Figure 6A:
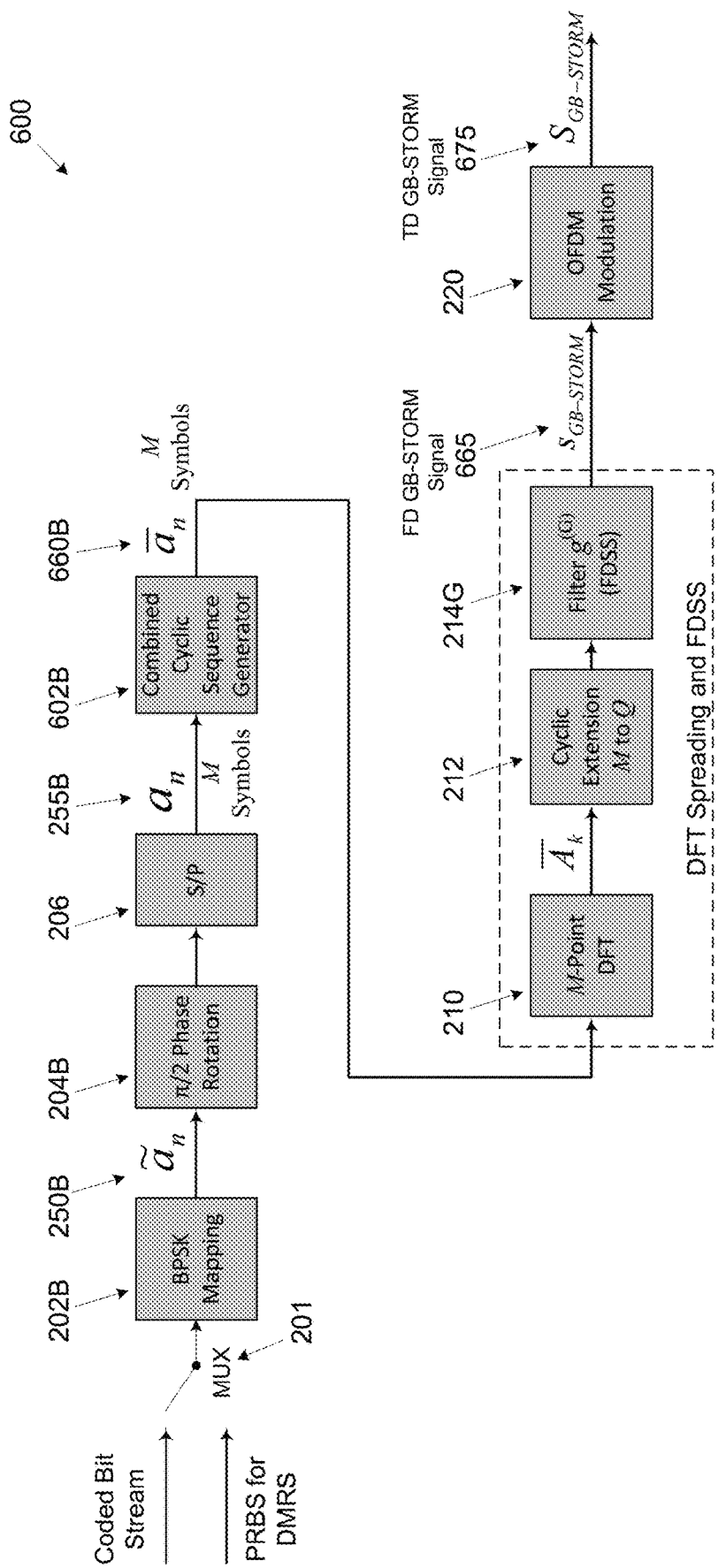
FIG. 6A and FIG. 6B present block diagrams of transmitter processes utilizing a single Gaussian pulse shaping function to create a low-PAPR binary mode (B-STORM) signal, according to embodiments.
Figure 6B:
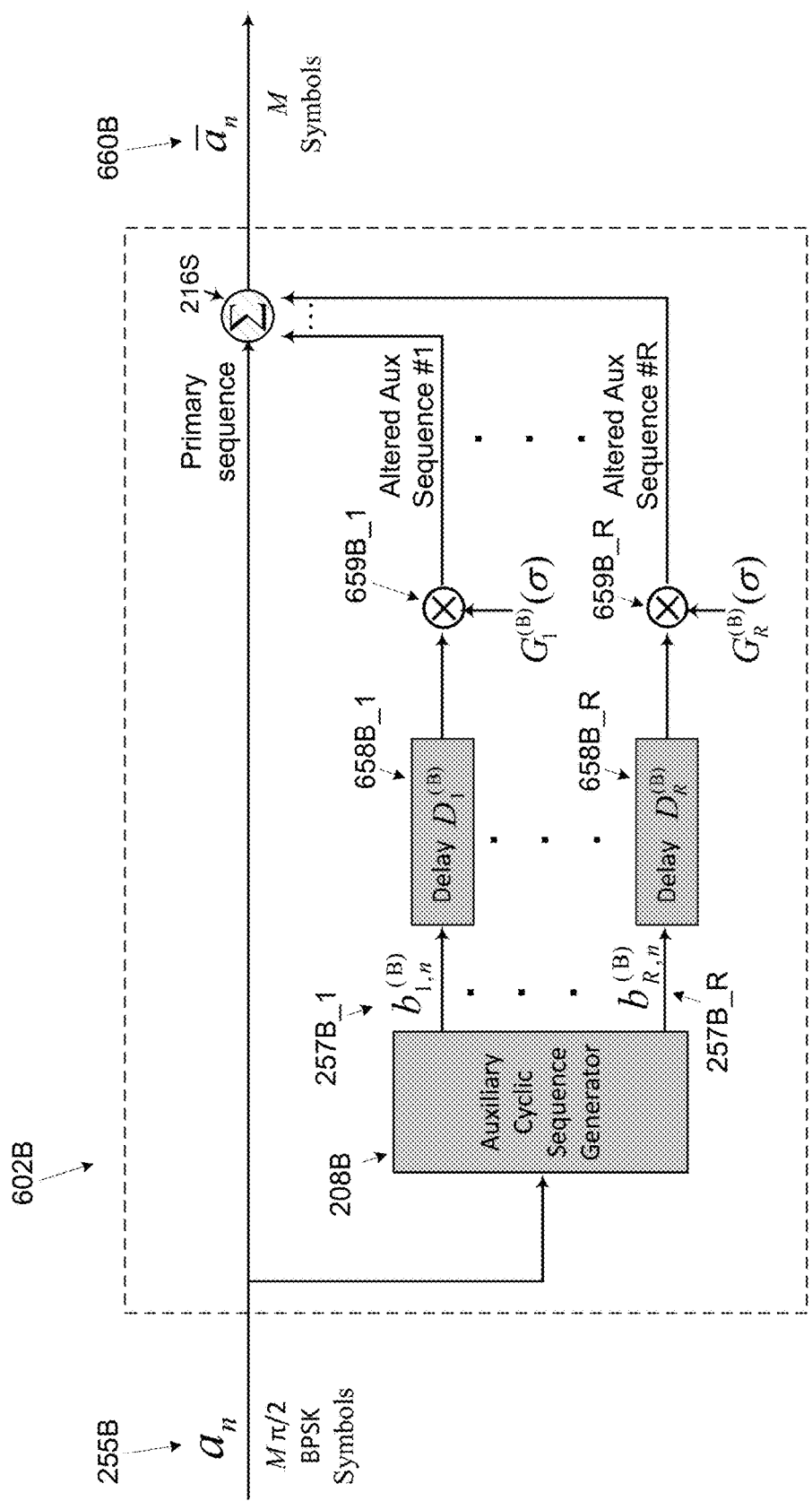

Reference is now made to FIG. 6A and FIG. 6B, which present block diagrams of transmitter processes utilizing a single Gaussian pulse shaping function to create a low-PAPR binary mode (B-STORM) signal, according to embodiments. A process 600 executed by a processor such as the processor(s) 110 of a transmitter such as the transmitter 102 follows a STORM process such as the process 200 with some adaptation for using a Gaussian pulse shape $\phi^{(G)}(t)$ for creating a binary mode Gaussian based signal $S_{GB-STROM}$ 675 (GB-STORM). The created GB-STORM signal $S_{GB-STROM}$ 675 is equivalent to a STORM signal $S_{STORM}$ 275 of process 200 created by joining a primary signal, constructed using a primary FDSS Filter $g^{(0)}$ 214A implementing in FD the Gaussian pulse shape $\phi^{(G)}(t)$, together with one or more auxiliary signal(s) constructed in process 200 by using auxiliary FDSS filters $g^{(r)}$ 214B, implementing in FD the pulse shaping by the functions $\phi_r^{(B)}(t)$ which are derived via certain alterations from the Gaussian pulse shape $\phi^{(G)}(t)$.

In particular, for the binary mode, i.e. B-STORM, the process 600 removes the need for performing the steps required for creating separately the auxiliary FD signals $s_1$ 260A and $s_{2\_r}$ 260B (such as the signals $s_{2\_1}$ 260B_1 through $s_{2\_R}$ 260B_R) as in the general STORM process 200, before summing them up as may be performed by summation 216. Instead, the processor(s) 110 may apply a combined cyclic sequence generator 602B to generate a combined output sequence $\{\bar{a}_n\}$ 660B comprising a superposition of the primary sequence symbols $\{a_n\}$ 255B and weighted variants (obtained via gain change and/or cyclic shifts) of the plurality of auxiliary sequences $\{b_{r,n}\}$ 257B such as $\{b_{1,n}\}$ 257B_1 through $\{b_{R,n}\}$ 257B_R.

The operation executed by the combined cyclic sequence generator 602B, which basically replaces the auxiliary cyclic sequence generation as done by an auxiliary sequence generator such as the auxiliary cyclic sequence generator 208, may be constrained by the following processing rules:

For each symbol $a_n$ of the input sequence $\{a_n\}$ 255, the combined cyclic sequence generator 602B may create and output a fixed natural number P of complex symbols $\bar{a}_n$, which comprise elements of the output sequence $\{\bar{a}_n\}$ 660; particularly, in the binary mode of operation (under consideration here) P=1, so that the output and input sequences of the combined cyclic sequence generator 602B are of the same length M.

Decimating the output sequence $\{\bar{a}_n\}$ 660 into P sub-sequences $\{\bar{a}_n^{(i)}\}$, where i=0,1, . . . , P−1 and for each n=0,1, . . . , M−1 the relation $\bar{a}_n^{(i)} = \bar{a}_{Pn+i}$ holds, each complex symbol of any of the sub-sequences $\{\bar{a}_n^{(i)}\}$ may depend on a finite number of complex symbols of the input sequence $\{a_n\}$ 255 in a fixed predefined (may be i-dependent and configurable) cyclically-translational-invariant manner; formally, this means that P functions $f^{(i)}$ may be configured and used to specify the elements of the output sequence $\{\bar{a}_n\}$ via the relation $\bar{a}_n^{(i)} = f^{(i)}(a_{(n-L_-^{(i)}) \bmod M}, a_{(n-L_-^{(i)}+1) \bmod M}, \ldots, a_{(n+L_+^{(i)}) \bmod M})$, where for each i=0,1, . . . , P−1 the two (typically non-negative and small) integers $L_\pm^{(i)}$ satisfy the constraint $0 \le L_-^{(i)} + L_+^{(i)} < M$.

The primary Gaussian pulse shape $\phi^{(G)}(t)$ may be selected out of a 1-parameter family of functions as expressed in equation 14 below.

$$\phi^{(G)}(t) = \exp\left(-\frac{t^2}{\sigma^2 T^2}\right) \qquad \text{Equation 14}$$

In equation 14 the primary Gaussian pulse shape $\phi^{(G)}(t)$ is parametrized by the (positive) tunable "dimensionless variance" $\sigma^2$ whose value is roughly of order 1. The primary Gaussian pulse shape $\phi^{(G)}(t)$ is a real, non-negative and symmetric function of t, i.e. satisfies $\phi^{(G)}(-t) = \phi^{(G)}(t)$, where the shift in the symmetry point from $$t_0 = -\frac{1}{2}\Lambda T$$

(as assumed in equation 3 and equation 9) to $t_0=0$ in equation 14 is a matter of convention. However, the time support of $\phi^{(G)}(t)$ may not be strictly bounded within an interval of duration $(\Lambda+2)T$, but rather the function $\phi^{(G)}(t)$ is assumed to quickly decay outside this interval (as happens when $\sigma^2$ is not too large), and the formalism below in fact assumes that $\phi^{(G)}(t)$ vanishes outside this interval for relevant practical purposes. This suppression of the Gaussian pulse shape outside the interval $$\left(-\left(\frac{\Lambda}{2}+1\right)T,\left(\frac{\Lambda}{2}+1\right)T\right)$$

may be implemented (realized) via some multiplicative time window aiming to smooth the transition to zero at the two boundaries, as $$t \to \left(\mp\left(\frac{\Lambda}{2}+1\right)T\right)^{\pm},$$

an operation which is not further detailed herein. An alternative implementation to achieve the fast decay of the Gaussian pulse shape $\phi^{(G)}(t)$ outside this interval may be realized by relying on the frequency domain construction of the G-STORM signal using the FDSS filter representation as expressed in equation 13, which provides some approximation to the time domain shaping function(s) via truncation of the filter taps outside some finite bandwidth (e.g., dictated by the IFFT size N of the underlying OFDM Modulation 220). This may be done by selecting an appropriate value for Q in the dual spectral shaping filter FDSS filter 214G, which exhibits Gaussian behavior also in the frequency domain as expressed in equation 15 below.

$$g_k^{(G)} = \exp\left(-\left(\frac{\pi(k-k_0)\sigma}{M}\right)^2\right),$$ Equation 15

$$k = 0, 1, K, Q-1; M \leq Q \leq N$$

In equation 15, $k_0$ controls the frequency offset of the allocation bandwidth, in units of the subcarrier spacing $$\Delta f = \frac{1}{\tilde{T}} = (MT)^{-1},$$

and a possible overall k-independent scaling factor may be ignored.

In the GB-STORM mode, it follows from the general construction of equation 3, that the Gaussian pulse shapes $\phi_r^{(B)}(t)$, used for shaping the auxiliary signal(s) when the primary signal is shaped using $\phi^{(G)}(t)$ of equation 14, may be expressed by equation 16 below.

$$\phi_r^{(B)}(t) = G_r^{(B)}(\sigma)\phi^{(G)}(t+D_r^{(B)}T), \; r=1,2,K,2^\Lambda-1$$ Equation 16:

In equation 16, the time shift parameters (delays) $D_r^{(B)}$ and the attenuation parameters (gain factors) $G_r^{(B)}(\sigma)$ are expressed in equation 17 below.

$$D_r^{(B)} = \sum_{m=1}^{A} d_{r,m},$$ Equation 17

$$G_r^{(B)}(\sigma) = \exp\left\{-\frac{1}{\sigma^2}\left(\sum_{m=1}^{A}(2m+1)d_{r,m} - (D_r^{(B)})^2\right)\right\}$$

Equation 16 expresses the fact that—in the Gaussian case—any one of the auxiliary pulse shaping functions $\phi_r^{(B)}(t)$ is actually derivable from the single "universal" primary pulse shape of equation 14 (with the same common variance $\sigma^2$), just by applying a certain time shift parameter (delay) $D_r^{(B)}$ (which equals a natural number in units of T) and $\sigma^2$-dependent attenuation parameter (gain factor) $G_r^{(B)}(\sigma)$, both (pre-)calculable relatively simply, according to equation 17, while using the variables $d_{r,m}$ which are defined in equation 2.

The combined cyclic sequence generation 602B applied by the processor(s) 110 may therefore be simple to implement. Since the primary signal and the auxiliary signal(s) are created using the single Gaussian pulse shaping function $\phi^{(G)}(t)$, the combined cyclic sequence generator 602B may involve a simple joining (summing) of the primary symbol sequence $\{a_n\}$ 255 together with the auxiliary symbol sequences $\{b_{r,n}\}$ 257_r into which the attenuation parameters $G_r^{(B)}(\sigma)$ and time shift parameters $D_r^{(B)}$ are absorbed (cf. equation 18 below).

The processor(s) 110 may drive the output of the combined cyclic sequence generator 602B into a single processing path comprising an M-Point DFT 210, a single cyclic extension 212, and a single FDSS filters $g^{(G)}$ 214G, regardless of the number of auxiliary signal components (which may be equal or greater than 1) that are selected for creating the GB-STORM signal $S_{GB-STROM}$ 675. The coefficients of the FDSS filters $g^{(G)}$ 214 are given by equation 15 and the combined cyclic sequence generator 602B may implement the mathematical operation expressed by equation 18 below.

$$\bar{a}_n = a_n + \sum_{r=1}^{R} G_r^{(B)}(\sigma) b_{r,(n+D_r^{(B)}) \bmod M}^{(B)},$$ Equation 18

$$n = 0, 1, K, M-1$$

In equation 18, the auxiliary sequence components $b_{r,n}^{(B)}$ are given in equation 2 and the alteration parameters, i.e. the attenuation parameters $G_r^{(B)}(\sigma)$ and the time shift parameters $D_r^{(B)}$, are expressed in equation 17.

An implementation of the combined cyclic sequence generator 602B is presented in FIG. 6B. Each block delay 658B_r such as block delay 658_1 through block delay 658B_R implements a cyclic index shift ("time shift") of its input. For any r=1,2, . . . , R the output of the block delay 658_r, fed with the respective auxiliary symbol $b_{r,n}^{(B)}$ 257B_r (i.e. 257B_1 through 257B_R) may produce a delayed signal $b_{r,(n+D_r^{(B)}) \bmod M}^{(B)}$ (for any n=0,1, . . . , M-1), which may then be multiplied by a (real) gain $G_r^{(B)}(\sigma)$ using a respective multiplier 659B_r (i.e. 659B_1 through 659B_R). The respective symbols of the resulting altered auxiliary sequences for all r=1,2, . . . , R, may then be summed up together with the primary symbol input $a_n$ 255B using a summation operator 216S to produce an element $\bar{a}_n$ of the combined symbol sequence $\{\bar{a}_n\}$ 660B at the output of combined cyclic sequence generation 602B.

In an implementation in which only a single auxiliary signal is included in the GB-STORM signal $S_{GB-STROM}$ 675 (i.e. R=1), equation 18 may be reduced to the expression of equation 19 below.

$$\bar{a}_n = e^{j\pi\alpha_n/2}(1+(-1)^{(\delta_{(n+1) \bmod M} - \delta_{(n-1) \bmod M})/2} e^{-2/\sigma^2}), \; n=0,1,$$
$$K, M-1$$ Equation 19:

In equation 19, the elements of the pi/2-BPSK primary sequence may be parameterized according to equation 20 below.

$$\pi/2\text{-}BPSK: a_n = e^{j\pi\alpha_n/2}, \text{ with}$$ Equation 20

$$\alpha_n \in Z, \alpha_n \equiv n(\bmod 2), \text{ and}$$

$$\delta_n = \alpha_n - \alpha_{(n-1) \bmod M} \in \{\pm 1\}.$$

Figure 7A:
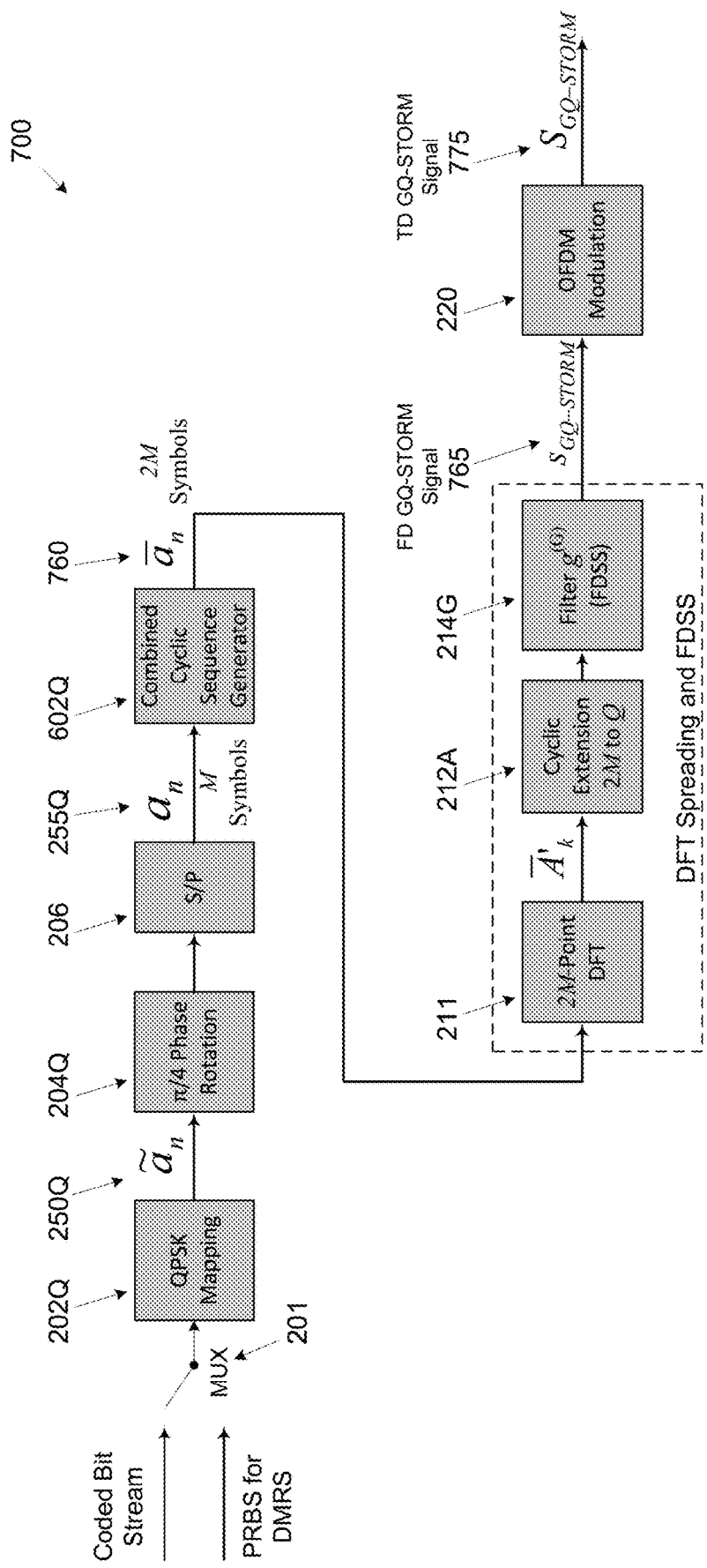
FIG. 7A and FIG. 7B are block diagrams of transmitter processes utilizing a single Gaussian pulse shaping function to create a low-PAPR quaternary mode (Q-STORM) signal, according to embodiments.
Figure 7B:
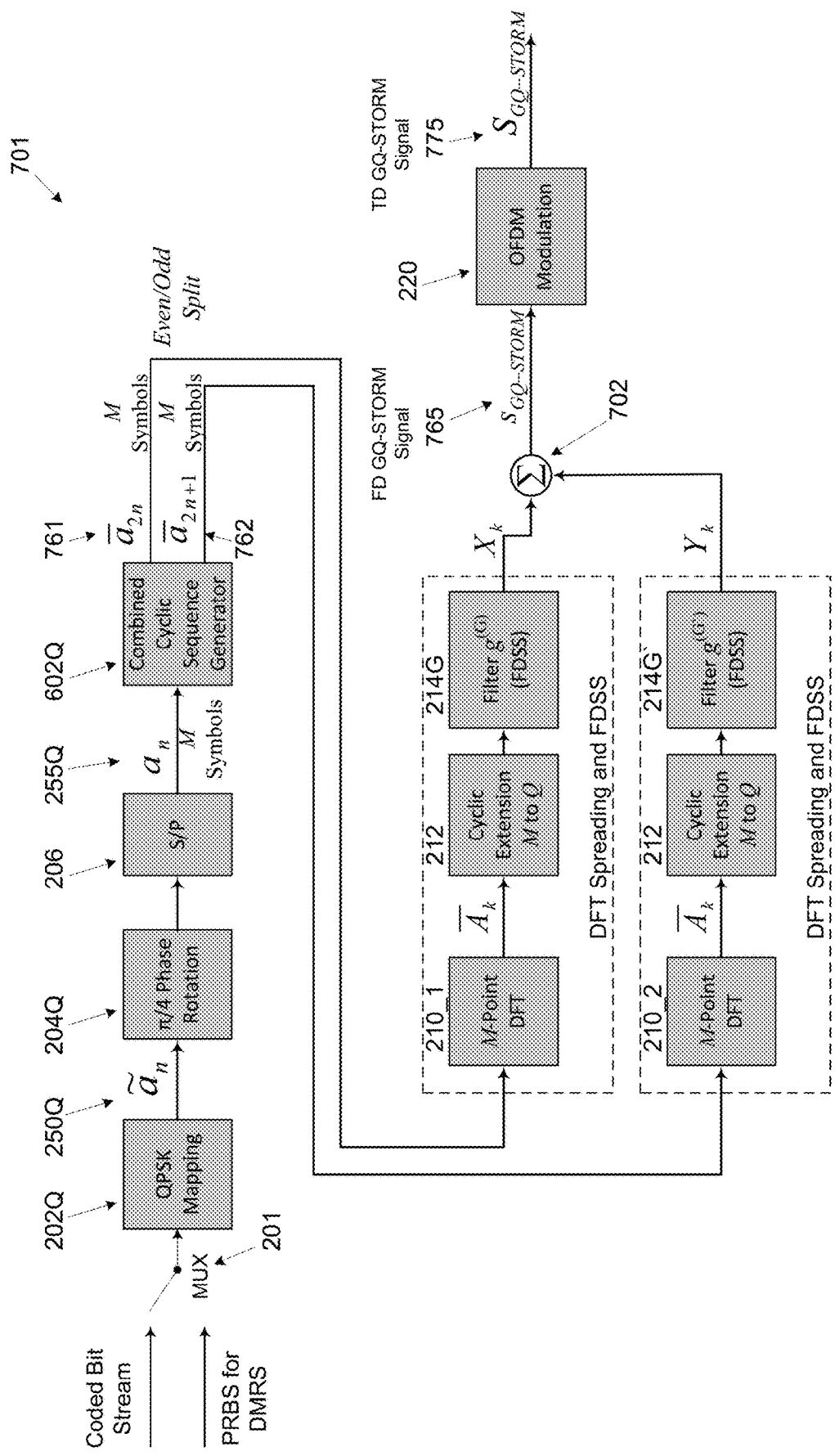

Reference is now made to FIG. 7A and FIG. 7B, which are block diagrams of transmitter processes utilizing a single Gaussian pulse shaping function to a create low-PAPR quaternary mode (Q-STORM) signal, according to some embodiments. A process 700 executed by a processor such as the processor(s) 110 of a transmitter such as the transmitter 102 extends the process 600 using a Gaussian pulse shape $\phi^{(G)}(t)$ for creating a quaternary mode Gaussian based signal $S_{GQ\text{-}STROM}$ 775 (GQ-STORM). The created GQ-STORM signal $S_{GQ\text{-}STROM}$ 775 is equivalent to a STORM signal $S_{STORM}$ 275 of process 200, created by joining a primary signal, constructed using a primary FDSS Filter $g^{(0)}$ 214A implementing in FD the Gaussian pulse shape $\phi^{(G)}(t)$, together with one or more auxiliary signal(s) constructed in process 200 by using auxiliary FDSS filters $g^{(r)}$ 214B, implementing in FD pulse shaping by the functions $\varphi_r^{(Q)}(t)$ which are derived via certain alterations from the Gaussian pulse shape $\phi^{(G)}(t)$. The main difference from the binary GB-STORM mode relates to extending the M-Point DFT 210 to a 2M-Point DFT 211 applied by the processor(s) 110 to the joint symbol sequence of the combined primary and auxiliary symbol sequences. This is due to the fact the for the GQ-STORM signal $S_{GQ\text{-}STROM}$ 775, the auxiliary pulse shapes may be altered with half-odd-integer time shift parameters (delays), in units of T.

In the GQ-STORM mode, it follows from the general construction of equation 3 that the Gaussian pulse shapes $\varphi_r^{(Q)}(t)$, used for shaping the auxiliary signal(s) when the primary signal is shaped using $\phi^{(G)}(t)$ of equation 14, may be expressed by equation 21 below.

$$\varphi_r^{(Q)}(t) = G_r^{(Q)}(\sigma)\phi^{(G)}(t+D_r^{(Q)}T), \; r=1,2,K,2\cdot3^\Lambda-1 \quad \text{Equation 21:}$$

In equation 21, the time shift parameters (delays) $D_r^{(Q)}$ and the attenuation parameter (gain factor) $G_r^{(Q)}(\sigma)$ are expressed in equation 22 below.

$$D_r^{(Q)} = \frac{r \bmod 2}{2} + \frac{1}{2}\sum_{m=1}^{\Lambda} c_{\lfloor r/2 \rfloor,m},$$

$$G_r^{(Q)}(\sigma) =$$

$$\exp\left\{-\frac{1}{\sigma^2}\left(\frac{r\bmod 2}{2} + \frac{1}{2}\sum_{m=1}^{\Lambda}(2m+1)c_{\lfloor r/2\rfloor,m} - (D_r^{(Q)})^2\right)\right\}$$

Equation 22

In equation 22, the variables $c_{\rho,m}$ are defined in equation 8, from which it follows that the time shift parameters (delays) $D_r^{(Q)}$ take half-integer values (in units of T).

As discussed herein above, in the single-DFT construction of the GQ-STORM signal $S_{GQ\text{-}STROM}$ 775 in process 700, the size of the DFT is 2M, as indicated in the 2M-Point DFT 211 whose size is double that of the M-Point DFT(s) 210 used in the generic STORM process 200 and the in the GB-STORM process 600. Accordingly, a combined (cyclic) sequence generator 602Q, which may be constrained by the same processing rules applicable for the combined (cyclic) sequence generator 602B (with the change that P=2 applies in the quaternary mode), outputs a sequence double the size of that of its input, implementing the mathematical operation expressed in equation 23 below.

$$\begin{cases}\bar{a}_{2n} = a_{2n} + \sum_{r=1}^{\lfloor R/2 \rfloor} G_{2r}^{(Q)}(\sigma)b_{2r,(n+D_{2r}^{(Q)})\bmod M}^{(Q)} \\ \bar{a}_{2n+1} = \sum_{r=1}^{\lfloor (R+1)/2 \rfloor} G_{2r-1}^{(Q)}(\sigma)b_{2r-1,(n+D_{2r-1}^{(Q)})\bmod M}^{(Q)}\end{cases},$$

Equation 23

$$n = 0, 1, K, M-1$$

In equation 23, the auxiliary sequence components $b_{r,n}^{(Q)}$ are given in equation 8 and the alteration parameters, i.e. the attenuation parameters $G_r^{(Q)}(\sigma)$ and the time shift parameters $D_r^{(Q)}$, are expressed in equation 22.

In an implementation in which only a single auxiliary signal is included in the GQ-STORM signal $S_{GQ\text{-}STROM}$ 775 (i.e. R=1), equation 23 may be reduced to the expression given in equation 24 below.

$$\begin{cases}\bar{a}_{2n} = a_n = e^{j\pi\alpha_n/4} \\ \bar{a}_{2n+1} = e^{-1/(4\sigma^2)} \cdot \underbrace{2\sin\left(\frac{\pi}{8}|\delta_{(n+1)\bmod M}|\right)}_{\in\{2\sin\frac{\pi}{8}=0.765, \, 2\sin\frac{3\pi}{8}=1.848\}}^{1\;4\;44\;2\;4\;4\;43} e^{j\pi(\alpha_{(n+1)\bmod M}+\alpha_n)/8}\end{cases},$$

Equation 24

$$n = 0, 1, K, M-1$$

In equation 24, the elements of the pi/4-QPSK primary sequence are parameterized according to equation 25 below.

$$\pi/4\text{-}QPSK: a_n = e^{j\pi\alpha_n/4}, \text{ with} \quad \text{Equation 25}$$

$$\alpha_n \in Z, \alpha_n \equiv n+1(\bmod 2), \text{ and}$$

$$\delta_n = \alpha_n - \alpha_{(n-1)\bmod M} \in \{\pm 1, \pm 3\}.$$

A process 701 which may be executed by the processor(s) 110 of the transmitter 102, presents an alternative implementation for creating the GQ-STORM signal $S_{GQ\text{-}STROM}$ 775. As shown in the process 701, the single 2M-Point DFT 211 implementation of the process 700 is replaced by a dual M-Point DFT 210 (210_1 and 210_2) implementation. The processor(s) 110 may operate the first M-Point DFT 210_1 to process a subset of even-indexed symbols $\{\bar{a}_{2n}\}$ 761 at the output of the combined cyclic sequence generator 602Q while operating the second M-Point DFT 210_2 to process a complementary subset of odd-indexed symbols $\{\bar{a}_{2n+1}\}$ 762 coming out of the combined cyclic sequence generator 602Q. The output of the first M-Point DFT 210_1 may be further cyclically extended and filtered by an FDSS filter $g^{(G)}$ 214, as in process 700. The output of the second M-Point DFT 210_2 may be further cyclically extended and filtered by an FDSS filter $g^{(G')}$ 214G' which is similar to the FDSS filters $g^{(G)}$ 214G but further incorporates an effective time delay by $$\frac{T}{2}$$

to a frequency domain output $Y_k$ relative to a frequency domain output $X_k$ coming out of the FDSS filters $g^{(G)}$ 214G processing path. The tap coefficients of the FDSS filter $g^{(G')}$ 214G' may be expressed by $g_k^{(G')} = g_k^{(G)} e^{-j\pi k/M}$ in terms of the tap coefficients of the FDSS filter $g^{(G)}$ 214G. The processor(s) 110 may then join 702 the FD signals $X_k$ and $Y_k$ coming from the two processing paths to a single FD signal $S_{GQ\text{-}STROM}$ 765, which in turn may be processed by the OFDM Modulation 220 to produce the time domain GQ-STORM signal $S_{GQ\text{-}STROM}$ 775.

We now introduce an additional notation $\gamma_r^{(X)}$, representing a dimensionless variables for parametrizing and/or selecting the attenuation parameters (gain factors) $G_r^{(Q)}(\sigma)$, where X represents the modulation scheme, for example, X=B for the B-STORM signal, X=Q for the Q-STORM signal, and/or the like. The relation between the attenuation parameters $G_r^{(X)}$ and the variables $\gamma_r^{(X)}$ may be expressed by equation 26 below.

$$\gamma_r^{(X)} = -\sigma^2 \ln G_r^{(X)}(\sigma) \Leftrightarrow G_r^{(X)}(\sigma) = e^{-\gamma_r^{(X)}/\sigma^2}, \; X \in \{B, Q\} \quad \text{Equation 26:}$$

Table 1 below presents the dimensionless time shift parameters (delays in units of T) and attenuation parameters (gain factors), expressed in terms of the variables $\gamma_r^{(X)}$ of equation 26, for the first few auxiliary components of the GB-STORM and GQ-STORM signals.

TABLE 1

| Auxiliary | GB-STORM | | GQ-STORM | |
|---|---|---|---|---|
| Index r | $D_r^{(B)}$ | $\gamma_r^{(B)}$ | $D_r^{(Q)}$ | $\gamma_r^{(Q)}$ |
| 0 (primary) | 0 | 0 | 0 | 0 |
| 1 | 1 | 2 | ½ | ¼ |
| 2 | 1 | 4 | ½ | 5/4 |
| 3 | 2 | 4 | 1 | 1 |
| 4 | 1 | 6 | 1 | 2 |
| 5 | 2 | 6 | ½ | 5/4 |

As stated above, the implementation of a receiver such as the receiver 104 for the Gaussian-based STORM signals is significantly simplified. For the GB-STORM signal the benefits of the simplification may be less significant, since the presence of the auxiliary signal component(s) may be typically ignored at the receiver 104 without suffering from a non-negligible detection loss. If it is nevertheless desirable to handle and detect one or more auxiliary signal components at a B-STORM receiver, then several WMFs like WMF 306A of process 300 may be required for general implementations, as in the implementation of the Q-STORM receiver process 400 (deploying two WMFS, such as WMF1 306B and WMF2 306C). However, in the case of the GB-STORM signal $S_{GB-STROM}$ 675, according to equation 15, only a single WMF 306A may be required to jointly detect the primary and one or more auxiliary signal components. Using the Gaussian pulse $\phi^{(G)}(t)$ may be of further advantage with respect to the construction of a frequency domain FD WMF, which may need to be performed dynamically at the receiver 104, depending on the allocated bandwidth (related to M in equation 15). This advantage, which may be relevant from complexity and/or memory resource requirement perspective, is applicable to any mode of the Gaussian-based STORM signals, not only the binary mode.

Figure 8:
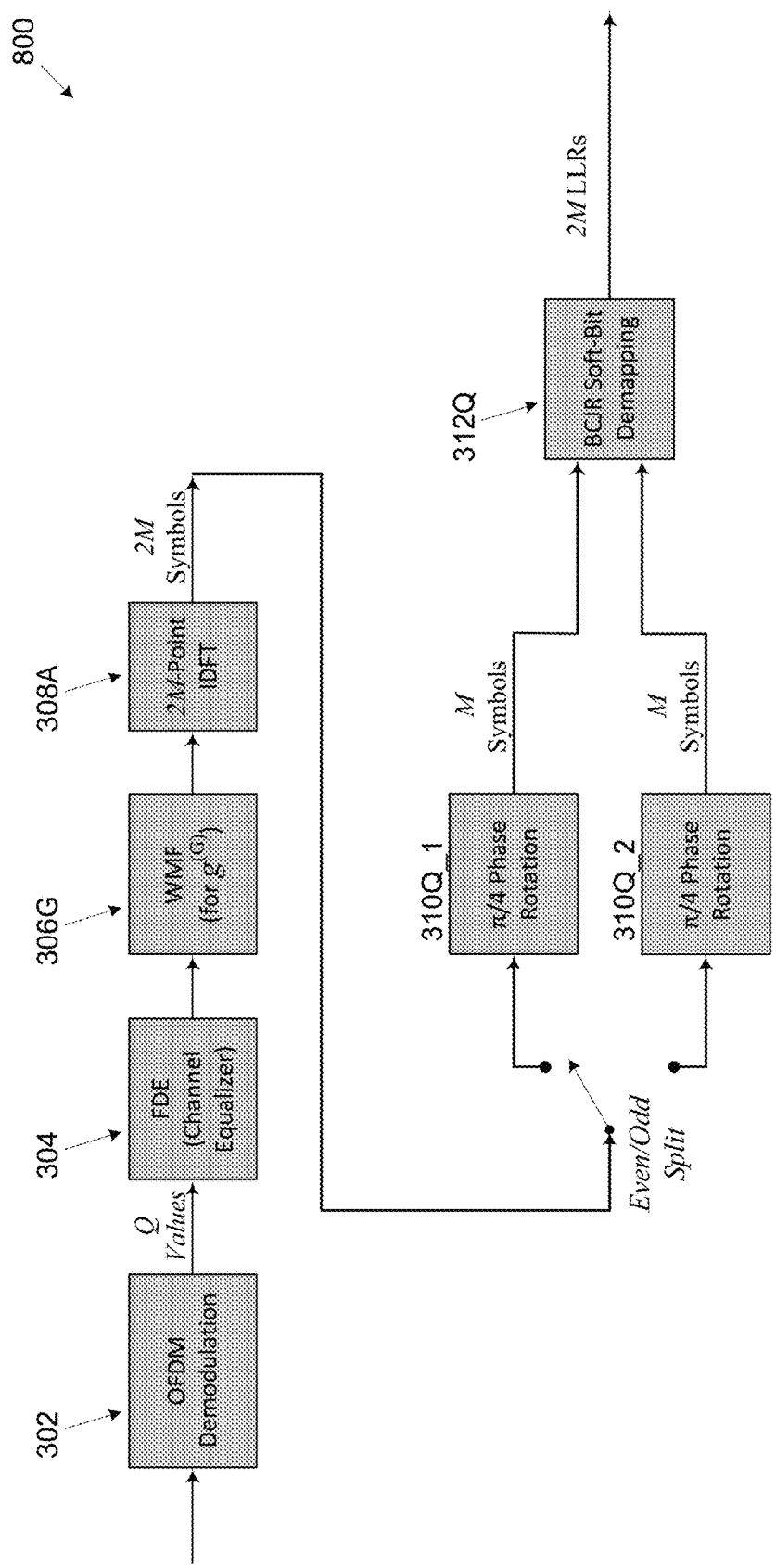
FIG. 8 is a block diagram of a Q-STORM receiver process for demodulating a low-PAPR quaternary mode signal created using a single Gaussian pulse shaping function, according to an embodiment.

Reference is now made to FIG. 8, which is a block diagram of a STORM receiver process for demodulating a low-PAPR quaternary mode signal created using a single Gaussian pulse shaping function, according to an embodiment. A process 800 for demodulating GQ-STORM signals such as the GQ-STORM signal $S_{GQ-STROM}$ 775 received from a transmitter such as the transmitter 102 may be executed by a processor such as the processor(s) 120 of a receiver such as the receiver 104. As shown in the process 800, using the Gaussian pulse shaping $\phi^{(G)}(t)$ may allow for a major simplification of the receiver 102 which may be implemented with a single WMF 306G. The implementation of the WMF 306G may depend on whether Q is selected to be larger, equal or smaller than 2M in the cyclic extension blocks 212 and/or 212A of processes 700 or 701 in a transmitter such as transmitter 102 which transmitted the GQ-STORM signal $S_{GQ-STORM}$ to be received using process 800 under consideration.

After splitting the demodulated sequence of 2M symbols to two sequences comprising the even and odd symbols, the processor(s) 120 may apply a pi/4 phase rotation 310Q_1 and 310_Q2 to each of the even and odd symbol sequences, respectively, to extract the un-rotated symbols. Finally, to extract the per-bit LLRs from the demodulated symbol sequences, the processor(s) 120 may apply a BCJR soft-bit de-mapping 312Q. The complexity of the BCJR soft-bit de-mapping 312Q (i.e. the number of states it employs) may depend on the number of auxiliary signal(s) components of non-negligible power that are included in the GQ-STORM signal $S_{GQ-STROM}$ 775 by a transmitter such as the transmitter 102. This dependency may arise through the time shifts (delays) $D_r^{(Q)}$ introduced by the auxiliary signal(s) components.

Performance of the Gaussian based STORM architecture and implementation is evaluated, in particular with respect to prior art modulation schemes, and the results are presented herein. The performance is evaluated for various aspects of the transmission schemes, in particular, PAPR performance, output power performance, detection performance and overall link (coding rate) performance.

Figure 9A:
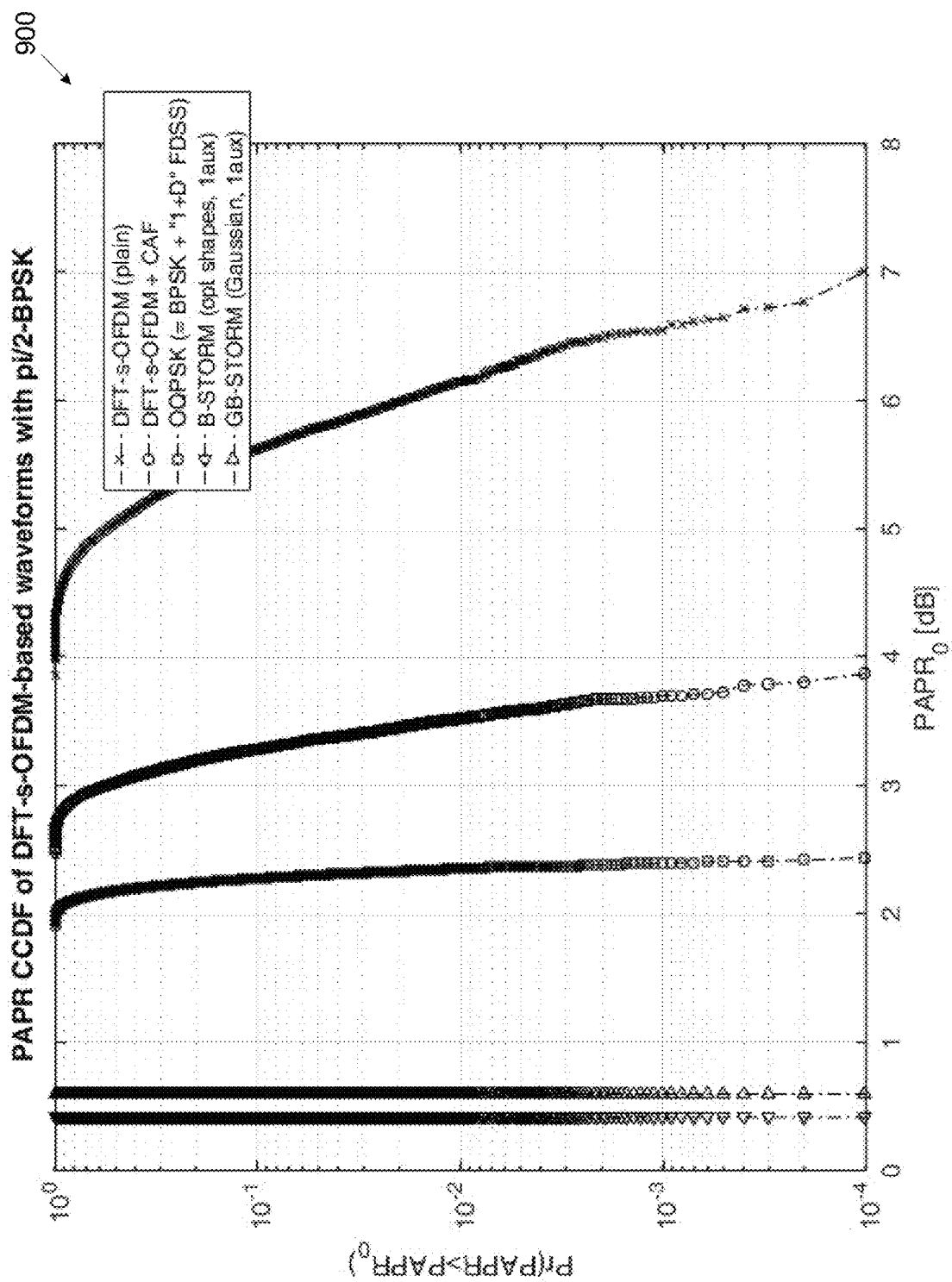
FIG. 9A and FIG. 9B are graph charts presenting PAPR performance for Gaussian B-STORM (GB-STORM) and Gaussian Q-STORM (GQ-STORM) signals, according to embodiments.
Figure 9B:
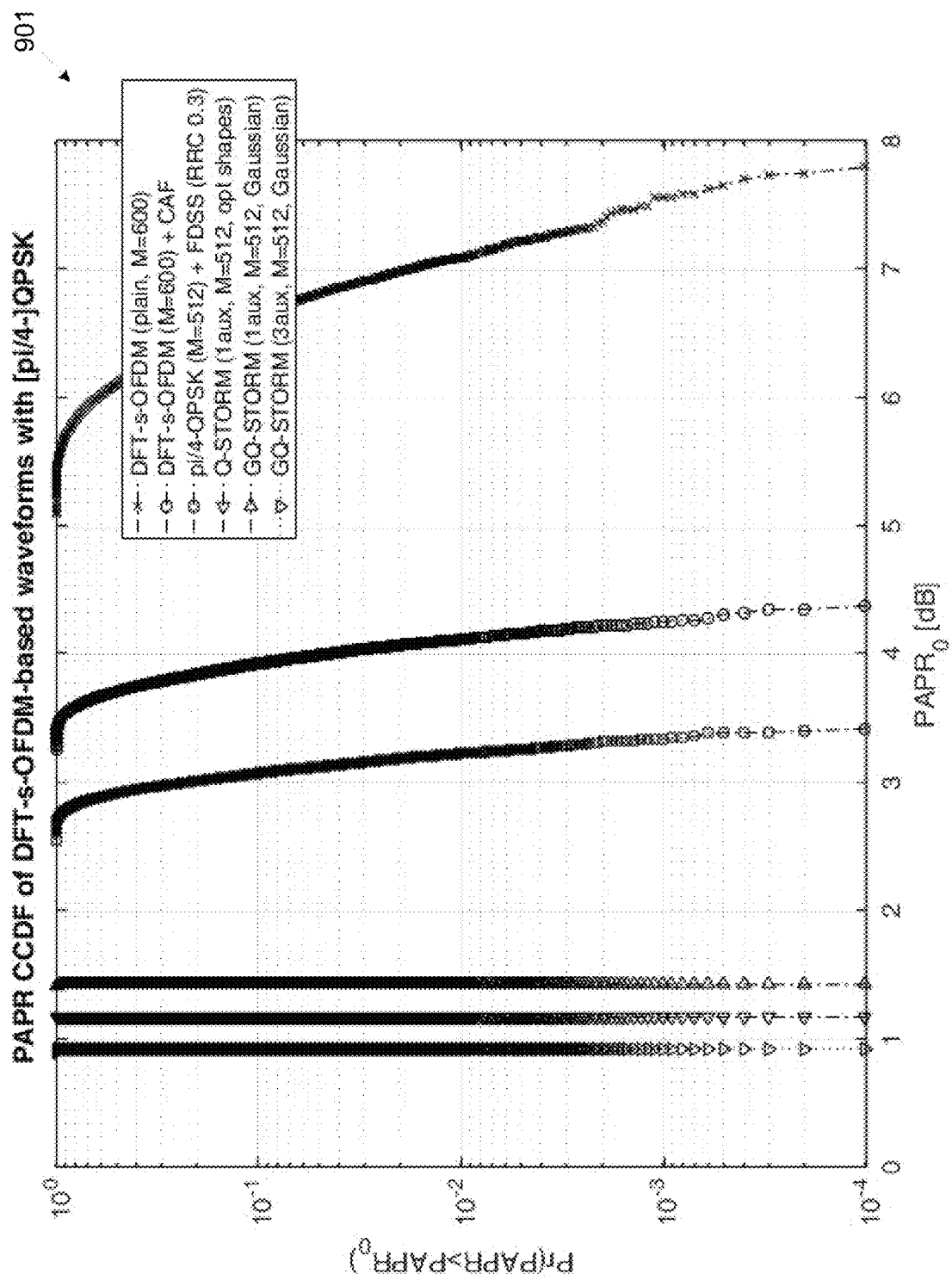

Reference is now made to FIG. 9A and FIG. 9B, which are graph charts presenting PAPR performance for GB-STORM and GQ-STORM signals.

A graph chart 900 presents the PAPR performance of GB-STORM alongside the PAPR performance of other DFT-s-OFDM-based schemes using pi/2-BPSK modulation. All schemes are evaluated over 10000 OFDM symbols with M=600 allocated subcarriers (where the spacing of the subcarriers is irrelevant in this context), using CP of length ~7% of the symbol duration, tailoring of consecutive OFDM symbols using Window OverLap and Add (WOLA) to suppress discontinuities at their boundaries, and ×4 up-sampling before measuring the peak power and average power per OFDM symbol, required for generating the PAPR distributions.

As seen in the graph chart 900, the baseline scheme, namely plain DFT-s-OFDM exhibits a PAPR of ~7 dB. It should be noted that when characterizing the PAPR of a waveform by a single value, instead of the more informative full Complementary Cumulative Distribution Function (CCDF), the convention of referring to the 10-4 point of the CCDF is used in the discussion herein whenever applicable.

As seen in the graph chart 900, when applying a well-known PAPR reduction technique of Clipping/Commanding and Filtering (CAF) to the plain DFT-s-OFDM, i.e. when using DFT-s-OFDM+CAF, the PAPR may typically decrease by ~3 dB, when limiting to reasonable levels both the complexity of the processing involved in the CAF operation as well as the resulting level of OOBE.

As seen in the graph chart 900, the OQPSK scheme described as prior art herein above (FIG. 5), may yield a relatively low PAPR of 2.4 dB.

As seen in the graph chart 900, the B-STORM signal using a primary signal component (with an optimized pulse shaping for this scenario) together with a single dominant coupled auxiliary component, may exhibit a PAPR of 0.4 dB.

As seen in the graph chart 900, the reduced-complexity GB-STORM scheme, using the universal Gaussian shaping function $\phi^{(G)}(t)$ constructed using FDSS filters $g^{(G)}$, as expressed in equation 15 with $\sigma=0.87$, leads to a minor degradation of 0.2 dB in the PAPR performance compared to the optimized B-STORM performance.

It should be further noted that the selected value of the variance $\sigma$ of the Gaussian shaping function $\phi^{(G)}(t)$ implies that the power of the single (first) auxiliary component is ~22 dB lower than that of the primary, which may thus be neglected at a receiver such as the receiver 104 without degrading the detection performance.

A graph chart 901, presents PAPR performance for a GQ-STORM signal, compared to other DFT-s-OFDM-based schemes with [pi/4−]QPSK modulation.

The evaluation methodology is the same as in the BPSK case (binary mode) presented in the graph chart 900, however, the size M of the DFT provides a degree of freedom in the implementation and may be selected accordingly for controlling the spectral containment of the overall signal, constrained by a common allocated bandwidth of 600 subcarriers and same OOBE constraints in all presented schemes. The selected DFT sizes M (as indicated in the legend per scheme in the graph chart 901) reflect a tradeoff between spectral behavior in the presence of a certain PA model and the detection performance, taking into account required coding rate adjustments. The detection performance and overall link (coding rate) performance are presented hereinafter.

As seen in the graph chart 901, the PAPR performance of the plain DFT-s-OFDM scheme with or without the pi/4 phase rotation is essentially the same, namely ~7.8 dB. This is in contrast to the pi/2 rotation which substantially improves the baseline plain DFT-s-OFDM performance in the BPSK case.

As seen in the graph chart 901, applying CAF onto the baseline DFT-s-OFDM waveform, i.e. using DFT-s-OFDM+CAF with M=600, may reduce the PAPR from 7.8 dB to 4.4 dB.

As seen in the graph chart 901, another PAPR reduction scheme, designated pi/4-QPSK+FDSS (RRC), using M=512 and applying an RRC FDSS filter (with roll-off factor 0.3) may further reduce the PAPR, down to 3.4 dB.

As seen in the graph chart 901, the Q-STORM waveform with a single auxiliary component (using a primary pulse shape optimized for this scenario, and the associated auxiliary shaping derived according to equation 9) exhibits a PAPR (for a QPSK-based scheme) of 1.2 dB.

As seen in the graph chart 901, when a single dominant auxiliary signal component is included in the reduced-complexity GQ-STORM waveform (designated "GQ-STORM (1 aux)" in the graph legend) using the universal Gaussian shaping function $\phi^{(G)}(t)$ constructed using FDSS filters $g^{(G)}$ as expressed in equation 15 with $\sigma$=0.56, results in a minor increase of 0.25 dB in the PAPR relative to that of the optimized Q-STORM scheme.

However, as seen in the graph chart 901, the reduced-complexity GQ-STORM scheme designated "GQ-STORM (3 aux)", which uses 2 additional auxiliary components (which in the GQ-STORM implementation may involve a marginal extra complexity cost) in fact leads to a superior PAPR performance of ~0.9 dB, lower than that of the optimized Q-STORM with a single auxiliary component.

However, for both Q-STORM and GQ-STORM with the above value of the variance $\sigma$ of the Gaussian shaping function $\phi^{(G)}(t)$ for GQ-STORM, the power of the first (dominant) auxiliary component is only ~4-5 dB lower than that of the primary, which cannot be neglected anymore at the receiver 104 without suffering a substantial compromise in detection performance. This issue will be further addressed later on, as part of the discussion on the overall link performance.

The output power performance of the G-STORM is now discussed.

In practice, the actual advantage of using a reduced-PAPR waveform is measured through an achievable gain in maximal output power, when using a given PA. Typically, what limits the output PA power is not the saturation point of the PA, but rather the non-linear effects which become more dominant when the saturation point is approached, thus leading to adverse distortions of the output signal (relative to the input waveform). The level of distortions is constrained by certain spectral constraints which consequently limit the maximal output power, and hence limit the coverage range. This is usually the case, with waveforms having PAPR which is not very small. However, the situation is different with the STORM architecture, by virtue of its near-constant modulus property.

Output power performance evaluation results are presented below for G-STORM, using a memoryless modified Rapp PA model (with smoothing factor p=1.1) which was proposed as a practical model for simulating 5G uplink performance in high frequency bands (above 6 GHz). The saturation power of the PA model is rescaled up to the power class of 23.0 dBm, e.g. reflecting simultaneous usage of multiple PAs of the same type.

Figure 10:
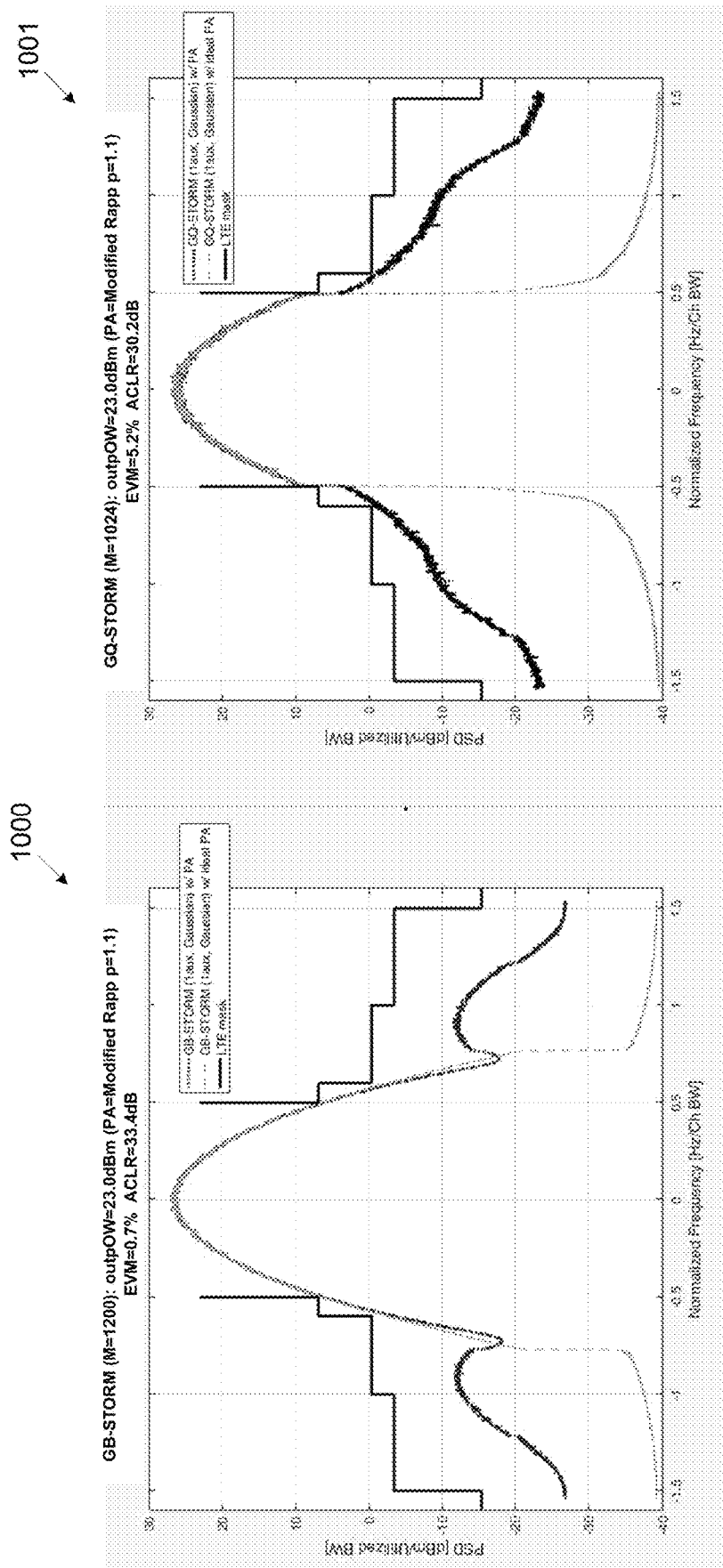
FIG. 10 provides graph charts presenting Power Spectral Densities (PSD) of GB-STORM and GQ-STORM signals, generated according to embodiments, after the signals were amplified by a Power Amplifier (PA)

Reference is now made to FIG. 10, which includes graph charts presenting Power Spectral Densities (PSD) of GB-STORM and GQ-STORM signals, created according to embodiments.

Graph charts 1000 and 1001 present the PSDs of GB-STORM and GQ-STORM signals, respectively, after processing by an ideal (linear) PA as well as by the abovementioned PA model.

As seen in the graph chart 1000 and 1001, for both GB-STORM and GQ-STORM the maximum power of 23.0 dBm may be reached while still satisfying the LTE UE RF requirements as outlined in the 3GPP specification for a full BW allocation of 1200 subcarriers, in particular, complying with (1) the LTE spectral emission mask (as plotted in graph charts 1000 and 1001 alongside the PSDs); (2) an ACLR of no more than 30 dB; and (3) EVM below 17.5%. This means that even though the PAPR performance of the G-STORM signal may be somewhat inferior to that of the optimized STORM signal, still the same output power advantage is essentially maintained (using the PA model under consideration), while benefitting further from the added flexibility and reduced complexity of the G-STORM implementation.

The overall link performance of the G-STORM is now discussed.

As explained herein above, the overall gain of a transmission scheme should take into account not only the output power gain, as evaluated herein before (cf. FIG. 10, for instance), but also the detection performance of the used waveform at a receiver such as the receiver 104.

The overall link gain of the optimized B-STORM waveform (with a single auxiliary component) was already demonstrated in PCT Application No. PCT/EP2016/077147 titled "Synthesis of Near-Constant Modulus Waveform for High Frequency Transmission". With the modified Rapp PA model and RF requirements for the output power performance evaluation described above, both B-STORM and GB-STORM may exhibit an OBO reduction gain of 3.5 dB relative to the baseline pi/2-BPSK DFT-s-OFDM in a scenario of full-bandwidth allocation of 1200 subcarriers. This power advantage is obtained while the detection performance accompanying the usage of the GB-STORM involves a small penalty (loss) of ~0.1 dB in detection performance relative to B-STORM. This confirms the statement that the GB-STORM is a valid and useful variant of (B-)STORM, yielding a large coverage gain while offering a more practical implementation of increased flexibility and reduced complexity.

As for the Q-STORM, table 2 below presents more detailed evaluation results comparing the QPSK-based transmission schemes evaluated for the PAPR performance, i.e. plain DFT-s-OFDM, DFT-s-OFDM+CAF, pi/4-QPSK+FDSS (RRC 0.3), Q-STORM and GQ-STORM (both with a single auxiliary component). For all transmission schemes the simulations assume an allocation bandwidth of 1200 subcarriers, attempting to deliver 1 bit per resource element (i.e. per subcarrier per data OFDM symbol). As before, M is the size of the DFT 210, and the rate of the code used for generating the encoded data bit-stream for transmission (LTE Turbo code is used) is 0.5 or 0.586 for M=1200 and 1200, respectively, so that all modulation schemes sustain the same data rate when all blocks/packets are received at the same error rate. The detection loss is measured in AWGN channel (with ideal channel and noise estimation) at the working point of BLock Error Rate (BLER)=10%, when the transmitted signal is passed through the Rapp PA model as described above when activated with the minimal OBO possible which still complies with the spectral requirements. The pi/4-QPSK+FDSS (RRC 0.3) scheme does not introduce ISI into the waveform and so can be detected using a standard Maximum A-Posteriory (MAP) soft-bit demapper. For the Q-STORM schemes (with a single auxiliary, using either optimized or Gaussian pulse shaping), a 16-state BCJR soft-bit demapper (cf. block 312Q in processes 400 and 800) was used at the receiver 104.

signal(s). In the equations above, $G_r$ and $H_r$ are some configurable gain parameters, and $D_r$ are some configurable time shift parameters.

Figure 11A:
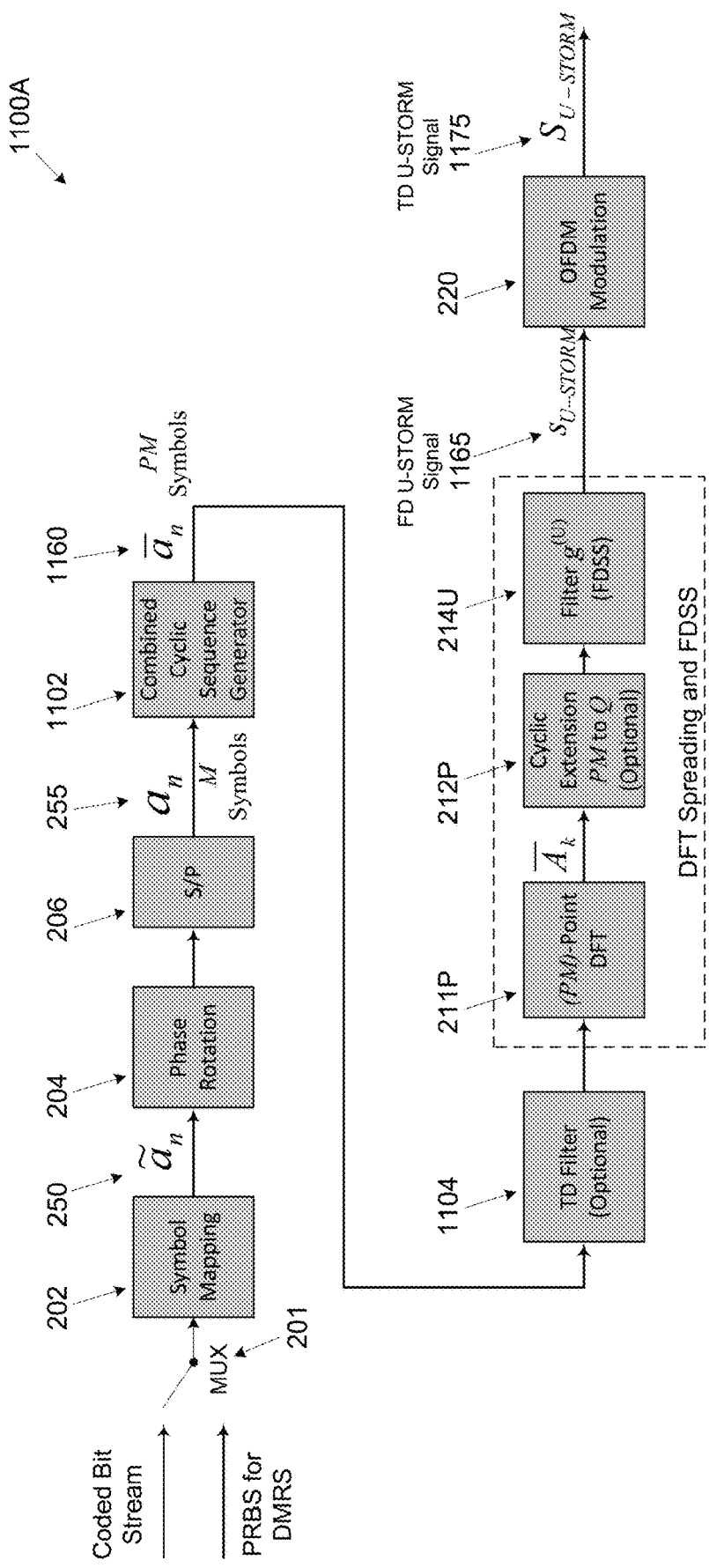
FIG. 11A, FIG. 11B and FIG. 11C are block diagrams of STORM transmitter processes utilizing a single universal pulse shaping function to create a low-PAPR Universal STORM (U-STORM) signal, according to embodiments.
Figure 11B:
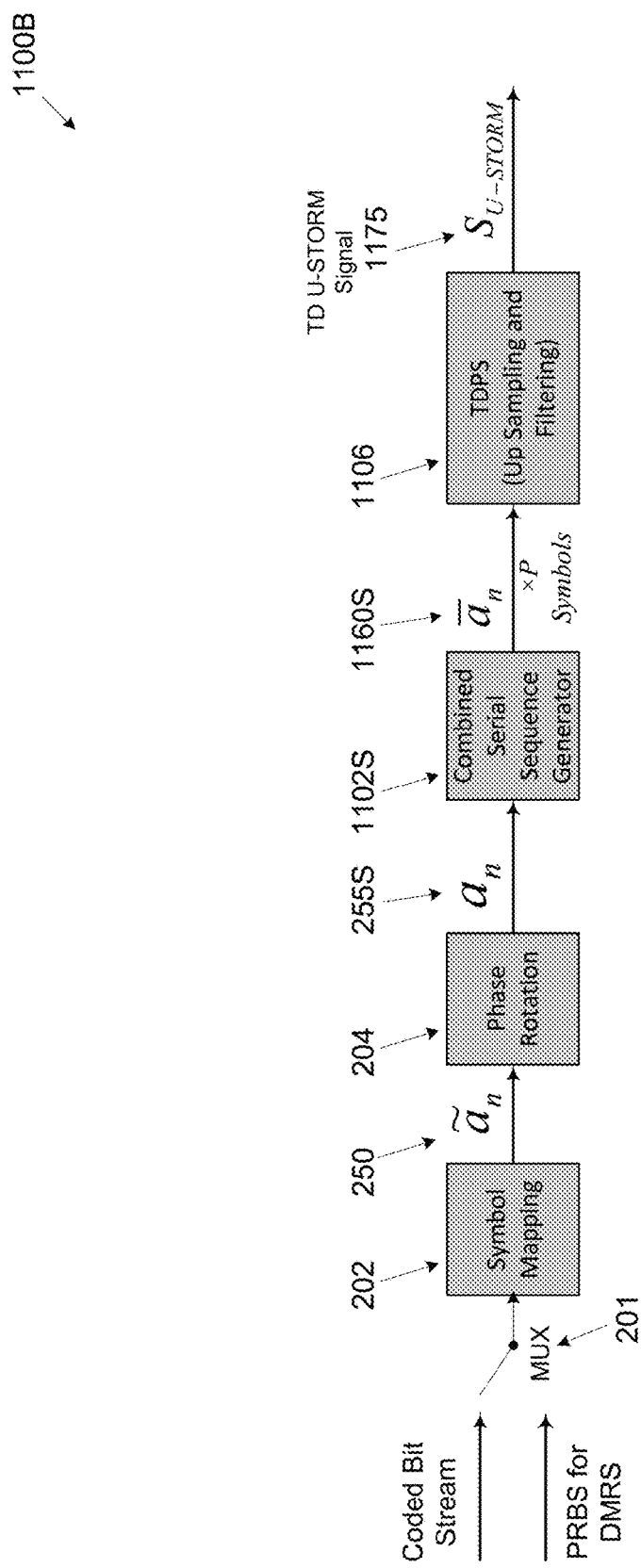
Figure 11C:
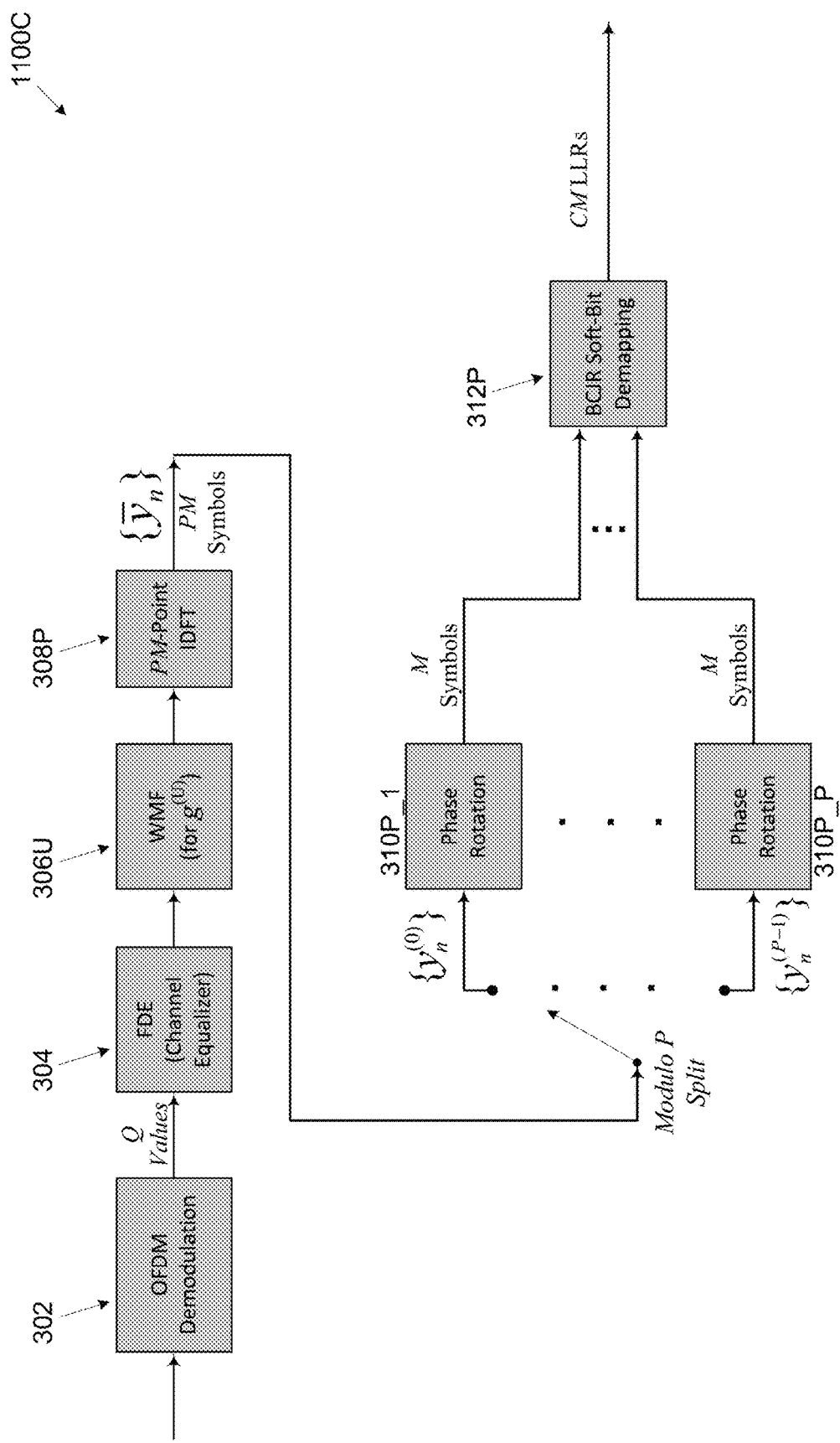

Reference is now made to FIG. 11A, FIG. 11B and FIG. 11C, which are block diagrams of STORM transmitter processes utilizing a single universal pulse shaping function to create a low-PAPR signal, according to embodiments. A process 1100A for creating low-PAPR transmission signals based on a single universal (unique) pulse shaping function $\phi^{(U)}(t)$ extends the process 600 and process 700 which are based on a single Gaussian pulse shaping function $\phi^{(G)}(t)$. The process 1100 may be executed by a processor such as the processor(s) 110 of a transmitter such as the transmitter 102.

As described in the processes 200, 600 and 700, the process 1100A starts with the processor(s) 110 receiving a coded bit-stream which may optionally alternate with a DMRS bit-stream through a MUX such as the MUX 201. The processor(s) 110 may divide the coded bit stream to consecutive groups of C bits per group, where C is a natural number. The processor(s) 110 may map 202 (modulate) each of the groups of C bits onto a complex symbol $\tilde{a}_n$ via a fundamental constellation of size $2^C$. For example, C=1 may be selected for a binary BPSK-based mode with a $\{\pm 1\}$ fundamental constellation. In another example, C=2 may be selected for a quaternary QPSK-based mode with a

TABLE 2

| Tx scheme: | | [Pi/4]-QPSK (baseline) M = 1200 | [Pi/4]-QPSK with CAF M = 1200 | Pi/4-QPSK with FDSS RRC 0.3 M = 1024 | Q-STORM (1 aux) M = 1024 | GQ-STORM (1 aux) M = 1024 |
|---|---|---|---|---|---|---|
| OBO for different RF requirements [dB] | (a) Min. OBO to fulfill ACLR | 5.6 | 4.6 | 4.4 | 0 | 0 |
| | (b) Min. OBO to fulfill EVM | 0.0 | 2.6 | 0.0 | 0 | 0 |
| | (c) Min. OBO to fulfill IBE | NA | NA | NA | NA | NA |
| (d) Min OBO to fulfill all RF reqs i.e., max{(a), (b),(c)} [dB] | | 5.6 | 4.6 | 4.4 | 0 | 0 |
| (e) Detection loss [dB] @ maximum output power | | 0 | 0.2 | 0.6 | 1.5 | 1.6 |
| Overall link gain (w.r.t. baseline), i.e. (5.6 − (d) − (e)) [dB] | | 0 | 0.8 | 0.6 | 4.1 | 4.0 |

As evident from table 2, similarly to the binary mode, the GQ-STORM scheme demonstrates a significantly improved overall link gain for the quaternary mode as well. For example, the GQ-STORM signal yields an overall link gain of 4 dB over the baseline QPSK DFT-s-OFDM scheme in this scenario, with only a minor performance compromise relative to the optimized Q-STORM variant.

The G-STORM implementation may be extended to a universal STORM implementation, designated herein after U-STORM. As shown earlier, in the G-STORM implementation a single pulse shaping Gaussian function $\phi^{(G)}(t)$ is used for creating the primary signal and one or more alterations (derivatives) $\varphi_r^{(G)}(t)=G_r\phi^{(G)}(t+D_rT)$ of the Gaussian function $\phi^{(G)}(t)$ are used to create the auxiliary signal(s). In the U-STORM implementation, the Gaussian function $\phi^{(G)}(t)$ may be replaced with a more general single universal (or unique) pulse shaping function $\phi^{(U)}(t)$ which may be used for creating the primary signal, and one or more alterations (derivatives) $\varphi_r^{(U)}(t)=H_r\phi^{(U)}(t+D_rT)$ of the universal function $\phi^{(U)}(t)$ may be used to create the auxiliary $$\left\{\pm\frac{(1\pm j)}{\sqrt{2}}\right\}$$

fundamental constellation. The processor(s) 110 may optionally apply a phase rotation to the constellation symbols relative to one another in a pre-defined manner. For example, in the binary BPSK based mode, a relative $\pi/2$ phase rotation may be applied between consecutive constellations. In another example, in the quaternary QPSK-based mode, a relative $\pi/4$ phase rotation may be applied between consecutive constellations.

The processor(s) 110 may apply a serial to parallel (S/P) conversion 206 to the sequence 250, after phase rotation has possibly been applied to it, to produce groups of consecutive M complex symbols $\{a_n\}$ 255 arranged in parallel to allow efficient block-wise processing by the processor(s) 110.

The processor(s) 110 then applies a combined cyclic sequence generator 1102 to the resulting sequence to generate an output sequence $\{\tilde{a}_n\}$ 1160 of complex symbols. The combined cyclic sequence generator 1102 may be constrained by the same processing rules applicable for the combined cyclic sequence generator 602B, i.e.:

For each symbol $a_n$ of the input sequence $\{a_n\}$ 255, the combined cyclic sequence generator 1102 may create and output a fixed natural number P of complex symbols $\bar{a}_n$, which comprise elements of the output sequence $\{\bar{a}_n\}$ 1160 so that it's total length is given by PM.

Decimating the output sequence $\{\bar{a}_n\}$ 1160 into P sub-sequences $\{\bar{a}_n^{(i)}\}$, where i=0,1, ..., P−1 and for each n=0,1, ..., M−1 the relation $\bar{a}_n^{(i)} = \bar{a}_{Pn+i}$ holds, each complex symbol of any of the sub-sequences $\{\bar{a}_n^{(i)}\}$ may depend on a finite number of complex symbols of the input sequence $\{a_n\}$ 255 in a fixed predefined (may be configurable, i-dependent) cyclically-translational-invariant formally, this means that P functions $f^{(i)}$ may be configured and used to specify the elements of the output sequence $\{\bar{a}_n\}$ via the relation $\bar{a}_n^{(i)} = f^{(i)}(a_{(n-L_-^{(i)}) \bmod M}, a_{(n-L_-^{(i)}+1) \bmod M}, \ldots, a_{(n+L_+^{(i)}) \bmod M})$, where for each i=0,1, ..., P−1 the two (typically non-negative and small) integers $L_\pm^{(i)}$ satisfy the constraint $0 \le L_-^{(i)} + L_+^{(i)} < M$.

The processor(s) 110 may apply one or more methods and/or implementations for generating the output sequence $\{\bar{a}_n\}$ 1160 from the input sequence $\{a_n\}$ 255. An implementation may utilize equations 18 and 23 (which rely on equations 2 and 8, respectively) presented for the binary mode GB-STORM signal (where P=1 applies) and the quaternary mode GQ-STORM signal (where P=2 applies), respectively.

However, more general constructions are possible for the combined cyclic sequence generator 1102 which may be motivated by one or more objectives, for example, achieving different desirable tradeoffs between the PAPR and the detection performance of the U-STORM signal (waveform) and/or the like. As an example for such a possible generalization applicable for the case of C=2 (QPSK-based), equation 27 below may be used to replace equation 24 (which serves as an explicit representation of a specialized case of equation 23 with a single auxiliary signal, namely for R=1).

$$\begin{cases} \bar{a}_{2n} = a_n = e^{j\pi\alpha_n/4} \\ \bar{a}_{2n+1} = e^{j\pi(\alpha_{(n+1)\bmod M} + \alpha_n)/8} \cdot \begin{cases} \eta_- & \text{if } |\delta_{(n+1)\bmod M}| = 1 \\ \eta_+ & \text{if } |\delta_{(n+1)\bmod M}| = 3 \end{cases} \end{cases}$$

Equation 27

$n = 0, 1, K, M - 1$ where $\eta_\pm$ are two non-negative constants, and the variables $\delta_n$ are defined in equation 25. Two particular examples of this kind of generalization may be specified by (1) $\eta_\pm=1$; and (2) $\eta_-=0.345$, $\eta_+=0.833$, for which equation 24 is recovered when $\sigma=0.56$.

The process 1100A may employ a hybrid implementation, processing the signal in both TD and FD, as follows: after the output sequence $\{\bar{a}_n\}$ 1160 is created, the processor(s) 110 may optionally apply TD filter 1104 (namely, a cyclic tapped delay line) to the output sequence $\{\bar{a}_n\}$ 1160 before converting it to the frequency domain through a (PM)-Point DFT 211P. The processor(s) 110 may apply a cyclic extension 212P from PM to Q values and/or an FDSS $g^{(U)}$ 214U to create an FD U-STORM signal $s_{U-STORM}$ 1165.

The FDSS $g^{(U)}$ 214U may be used to implement in FD the universal pulse shaping function $\phi^{(U)}(t)$, which may be used to create the primary and the auxiliary signal components of the U-STORM signal. As part of the extension of the G-STORM scheme into the U-STORM scheme, the attenuation parameters (gain factors) $G_r^{(X)}(\sigma)$ of equation 17 and equation 22 may be replaced by general attenuation parameters $H_r^{(X)}$ (e.g. X=B or Q, for the binary and quaternary modes, respectively), which may be tuned in order to optimize one or more performance metrics of the modulation and/or transmission schemes (depending on the selection of $g^{(U)}$ and the deployment scenario, for instance).

The processor(s) 110 may apply OFDM modulation 220 to the FD U-STORM signal $s_{U-STORM}$ 1165 to complete the generation of a segment of a TD U-STORM signal $S_{U-STORM}$ 1175 comprising a single OFDM symbol, and the concatenation of such segments may be performed by the processor(s) 110. Optionally, as part of the OFDM modulation 220, the processor(s) 110 may process the output sequence $\{\bar{a}_n\}$ 1160 to insert one or more guard sample segments such as, for example, a CP, a UW, a ZP, a ZT and/or the like before forwarding the TD U-STORM signal $S_{U-STORM}$ 1175 to a Digital to Analog (D/A) converter and to one or more PAs such as the PA 114 of the transmitter 102.

A process 1100B which may be executed by the processor(s) 110 is a pure TD process for generating a TD U-STORM signal $S_{U-STORM}$ 1175. The process 1100B starts out the same way like process 1100A, but avoids the S/P step 206 of process 1100A, and serially feeds the primary symbol sequence $\{a_n\}$ 255S into a combined serial sequence generator 1102S (instead of a combined cyclic sequence generator 1102), whose operation may be constrained by a non-cyclic version of the processing rules applicable for the combined cyclic sequence generator 1102, namely:

For each symbol $a_n$ of the input sequence $\{a_n\}$ 255S, where n is an integer, the combined serial sequence generator 1102S may create and output a fixed natural number P of complex symbols $\{\bar{a}_{Pn}, \bar{a}_{Pn+1}, \ldots, \bar{a}_{Pn+P-1}\}$, which are elements of the output sequence $\{\bar{a}_n\}$ 1160S.

Decimating the output sequence $\{\bar{a}_n\}$ 1160S into P sub-sequences $\{\bar{a}_n^{(i)}\}$, where i=0,1, ..., P−1 and for each integer n the relation $\bar{a}_n^{(i)} = \bar{a}_{Pn+i}$ holds, each complex symbol of any of the sub-sequences $\{\bar{a}_n^{(i)}\}$ may depend on a finite number of complex symbols of the input sequence $\{a_n\}$ 255S in a fixed predefined (may be configurable, i-dependent) translational-invariant manner; formally, this means that P functions $h^{(i)}$ may be configured and used to specify the elements of the output sequence $\{\bar{a}_n\}$ 1160S via the relation $\bar{a}_{Pn+i} = \bar{a}_n^{(i)} = h^{(i)}(a_{n-L_i}, a_{n-L_i+1}, \ldots, a_n)$, where $L_i$ is a (typically small) non-negative integer for each i=0,1, ..., P−1.

In the process 1100B, the processor(s) 110 may apply a Time Domain Pulse Shaping (TDPS) 1106 onto the output sequence $\{\bar{a}_n\}$ 1160S to create a shaped up-sampled TD U-STORM signal $S_{U-STORM}$ 1175.

A process 1100C for demodulating U-STORM signals such as the U-STORM signal $S_{U-STORM}$ 1175 received from a transmitter such as the transmitter 102 employing a waveform generation process such as process 1100A, may be executed by a processor such as the processor(s) 120 of a receiver such as the receiver 104. In the process 1102 (which generalizes the process 800 for demodulating GQ-STORM signals), processor(s) 120 may deploy a single WMF 306U which is adapted to perform matched filtering and whitening of a U-STORM signal which was shaped using an FDSS filter $g^{(U)}$ 214U. Next, after performing a (PM)-Point IDFT 308P on the output of WMF 306U, processor(s) 120 may split the PM output symbols $\{\bar{y}_n\}$ of IDFT 308P into P length-M sub-sequences $\{y_n^{(i)}\}$ (i=0, 1, . . . , P−1) by decimation (according to the relations $y_n^{(i)}=y_{Pn+i}$, n=0,1, . . . , M−1), and then may perform suitable phase rotations 310P on the symbols of each sub-sequence $\{y_n^{(i)}\}$ before feeding them into BCJR soft-bit demapping 312P, which outputs CM LLRs for further decoding of the transmitted data bits.

The universal shaping function implementation may be further demonstrated for the binary mode and the quaternary mode, i.e. UB-STORM and UQ-STORM respectively.

The construction of U-STORM signals may follow the combined (possibly cyclic) symbol sequence generation used by the G-STORM construction, as expressed in equations 18 and equation 23 for the GB-STORM and the GQ-STORM implementations, respectively. Such extensions to UB-STORM and UQ-STORM may be expressed by equation 28 below.

$$\text{UB-STORM: } \bar{a}_n = a_n + \sum_{r=1}^{R} H_r^{(B)} b_{r,(n+D_r^{(B)}) \bmod M}^{(B)} \quad \text{Equation 28}$$

$$\text{UQ-STORM: } \begin{cases} \bar{a}_{2n} = a_{2n} + \sum_{r=1}^{\lfloor R/2 \rfloor} H_{2r}^{(Q)} b_{2r,(n+D_{2r}^{(Q)}) \bmod M}^{(Q)} \\ \bar{a}_{2n+1} = \sum_{r=1}^{\lfloor (R+1)/2 \rfloor} H_{2r-1}^{(Q)} b_{2r-1,(n+D_{2r-1}^{(Q)}) \bmod M}^{(Q)} \end{cases}$$

where the auxiliary symbols $b_{r,n}^{(X)}$ (X=B,Q) are given by equations 2 and 8, the modM operations are everywhere avoided in a purely TD (serial, non-cyclic) implementation of the U-STORM waveform construction (such as that deployed in process 1100B), and the variables $H_r^{(X)}$ are configurable attenuation parameters generalizing the parameters $G_r^{(X)}(\sigma)$ of the G-STORM.

It should be noted that in a generalization to UQ-STORM of process 701, which utilizes a dual-DFT implementation to create a GQ-STORM signal $S_{GQ\text{-}STROM}$ 775, the FDSS filter $g^{(U')}$ (to be applied onto the combined sequence of odd-index symbols $\{\bar{a}_{2n+1}\}$ 762, analogous to FDSS filter $g^{(G')}$ 214G') may be related to a primary FDSS filter $g^{(U)}$ by a time shift (delay) parameter of $$\frac{T}{2},$$

namely according to the relation $g_k^{(U')}=g_k^{(U)}e^{-j\pi k/M}$ between their tap coefficients.

Figure 12:
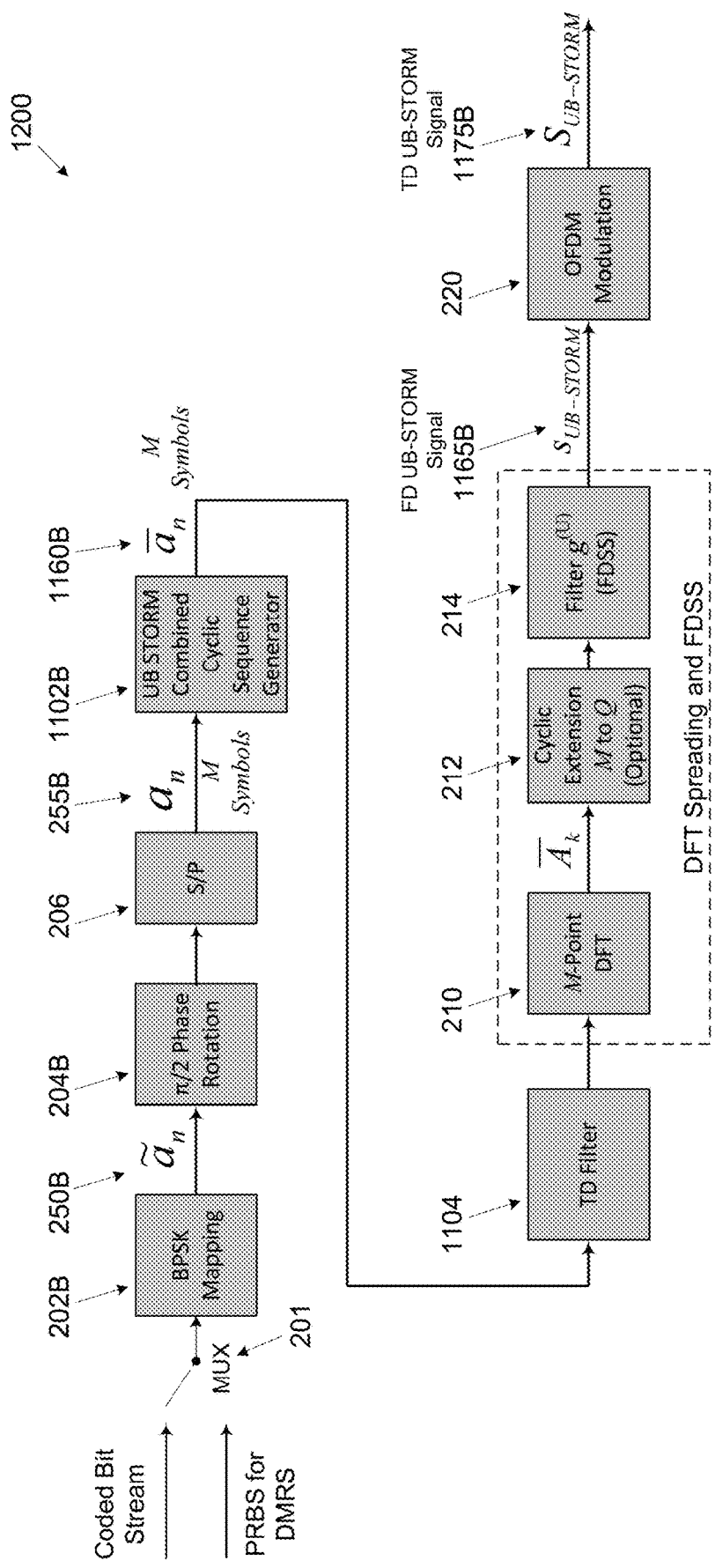
FIG. 12 is a block diagram of a transmitter process utilizing a single universal pulse shaping function to create a low-PAPR binary mode (UB-STORM) signal, according to an embodiment.

Reference is now made to FIG. 12, which is a block diagram of a transmitter process utilizing a single universal pulse shaping function to create a low-PAPR binary mode (UB-STORM) signal, according to embodiments. A process 1200 may generalize a process such as the process 600 for generating a TD UB-STORM signal $S_{UB\text{-}STORM}$ 1175B with a pre-DFT (cyclic) tapped delay line filter such as the TD filter 1104. The process 1200 may be executed by a processor such as the processor(s) 110 of a transmitter such as the transmitter 102.

Two specific examples of the process 1200 are provided in equation 29 below, which details the mathematical construction of the symbol sequence $\{\bar{a}_n\}$ 1160B given the symbol sequence $\{a_n\}$ 255B, an operation implemented by the UB-STORM combined cyclic sequence generator 1102B in FIG. 12. In particular, the attenuation parameters (gain factor values) implied in equation 29 are selected to minimize the PAPR of the TD UB-STORM signal $S_{UB\text{-}STORM}$ 1175B obtained with R=1 or R=3 in equation 28, when the (cyclic) TD filter 1104 is of type '1+D' (namely specialized to the TD Filter '1+D' 502 of process 500) and no FDSS is applied. (Eliminating the FDSS may be equivalent to the application of a "transparent" rectangular FDSS filter whose nonzero coefficients are $g_k=1$, $\forall k=0, 1, \ldots, M-1$.)

$$R = 1: \bar{a}_n = a_n + H_1^{(B)} b_{1,n+1} = a_n\left(1 + H_1^{(B)} \frac{a_{n+1} a_{n-1}}{a_n^2}\right) = \quad \text{Equation 29}$$

$$j^{\alpha_n}(1 + 0.1245 \cdot (-1)^{(\delta_{n+1}-\delta_n)/2})$$

$$R = 3: \bar{a}_n = j^{\alpha_n}(1 + 0.078 \cdot (-1)^{(\delta_{n+1}-\delta_n)/2} +$$

$$0.018 \cdot [(-1)^{(\delta_{n+2}-\delta_n)/2} + (-1)^{(\delta_{n+1}-\delta_{n-1})/2}])$$

Equation 29 utilizes the notation introduced in equation 20, and all index shift operations (e.g., n→n±1) may be understood as being performed cyclically modM. The extra additive distortion terms in equation 29, modifying the amplitudes of the original pi/2-BPSK symbols $\{a_n=j^{\alpha_n}\}$ 255B to yield the symbols $\{\bar{a}_n\}$ 1160B, which are fed in turn into the TD filter 1104, depend on the phases of the neighboring symbols in a precise predefined way. The exact values of the coefficients quoted therein are presented by way of example, and may be modified without changing the essence of the scheme. With the particular values in equation 29 and the TD Filter '1+D' 502 of process 500 playing the role of TD filter 1104 with no further post-DFT FDSS filter 214, a PAPR reduction of about 0.5-0.7 dB may be obtained relative to the baseline prior art scheme presented in the process 500 and/or the process 501.

Figure 13:
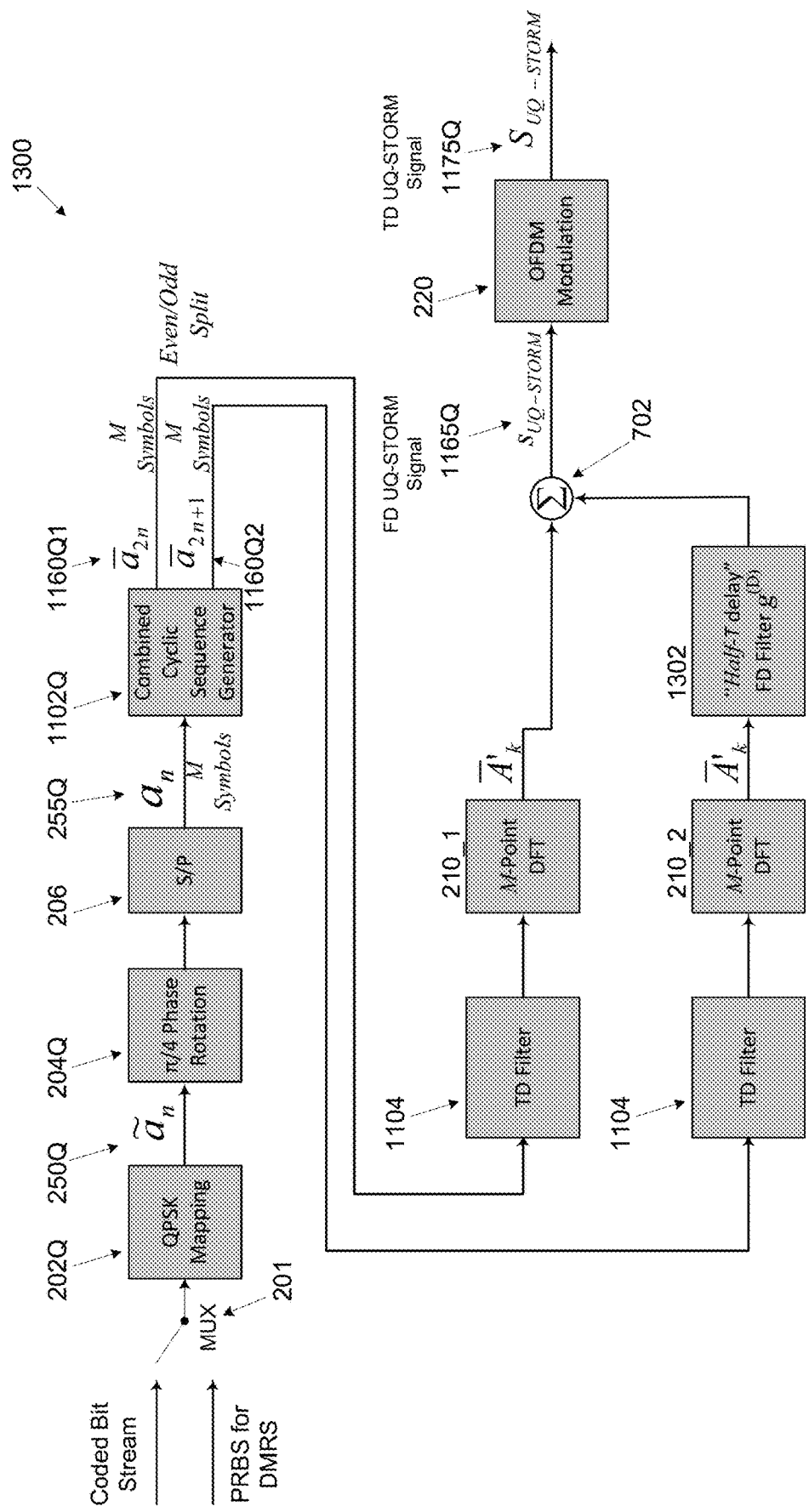
FIG. 13 is a block diagram of a transmitter process utilizing a single universal pulse shaping function to create a low-PAPR quaternary mode (UQ-STORM) signal, according to an embodiment.

Reference is now made to FIG. 13, which is a block diagram of a transmitter process utilizing a single universal pulse shaping function to create a low-PAPR quaternary mode (UQ-STORM) signal, according to embodiments. A process 1300 may generalize a process such as the process 701 to generate a TD UQ-STORM signal $S_{UQ\text{-}STORM}$ 1175Q with a pre-DFT tapped delay line filter such as the TD filter 1104. The process 1300 may be executed by a processor such as the processor(s) 110 of a transmitter such as the transmitter 102.

As shown in the process 1300, the processor(s) 110 may operate two M-Point DFT units, a first M-Point DFT 210_1 for processing a subset of even-indexed symbols $\{\bar{a}_{2n}\}$ 1160Q1 at the output of a combined cyclic sequence generator 1102Q and a second M-Point DFT 210_2 for processing a complementary subset of odd-indexed symbols $\{\bar{a}_{2n+1}\}$ 1160Q2 coming out of the combined cyclic sequence generator 1102Q. The processor(s) 110 may further apply an FD filter 1302 to the sequence coming out of the second M-Point DFT 210_2.

In an implementation of the process 1300, the TD filter 1104 employs a duo-binary '1+D' TD filter (such as the TD Filter '1+D' 502 of process 500) for processing both the odd and even indexed symbol sequences, $\{\bar{a}_{2n}\}$ 1160Q1 and $\{\bar{a}_{2n+1}\}$ 1160Q2, while the FD filter 1302 utilizes a "half-T delay" FD filter $g^{(D)}$ 1302 having M tap coefficients given by $g_k^{(D)}=e^{-j\pi k/M}$, k=0, 1, . . . , M−1. In such an implementation, the PAPR of the resulting UQ-STORM signal may be about 2 dB lower than that of a plain QPSK DFT-s-OFDM signal.

For several applications, it may be useful to switch back and forth between modulation schemes, for example, between a BPSK-based symbol stream and a QPSK-based symbol stream, within the same transmitted signal. A typical example may be implementing the DMRS stream with predefined BPSK-based pilot symbols, which may be inserted within a QPSK-based data symbol stream. Designing such a mixed-modulation (or hybrid) waveform within the context of the STORM signal construction, while maintaining the low PAPR properties of this transmission scheme, may present a major implementation challenge.

An embodiment of such a hybrid STORM implementation may be provided in the context of an SC-FDM-based implementation of Q-STORM, where the BPSK-based symbol sequence serves as a UW, which is inserted into the sequence of modulated QPSK data symbols every OFDM symbol.

In this example, a (cyclically) contiguous sequence of U pre-fixed pi/2-BPSK symbols is inserted within each block $A^\ell = \{a_n\}_{n=(\ell-1)M}^{\ell M - 1}$ of M symbols of the Q-STORM primary symbol sequence, where M is even and U<M (for example U=64, M=512M), and $\ell$ is the (integer) block index. This may indicate that the sub-sequence $\{a_{(\ell-1)M}, a_{(\ell-1)M+1}, \ldots, a_{(\ell-1)M+U_1-1}, a_{\ell M - U_2}, a_{\ell M - U_2+1}, \ldots, a_{\ell M-1}\} = \{u_{U_2}, u_{U_2+1}, \ldots, u_{U-1}, u_0, u_1, \ldots, u_{U_2-1}\}$ is a unique word of $U=U_1+U_2$ pi/2-BPSK symbols $u_n = e^{-j\pi \mu_n/2}$, $\mu_n \equiv n \pmod 2$, which repeats itself for every $\ell$, where $U_1$, $U_2$ are two non-negative integers. It should be noted that the remaining M−U symbols in each block $A^\ell$ of the primary symbol sequence, namely $\{a_{(\ell-1)M+U_1}, a_{(\ell-1)M+U_1+1}, \ldots, a_{\ell M - U_2 - 1}\}$, are pi/4-QPSK modulated data symbols. Consequently, there are two "exceptional" phase transients in each block, namely $a_{(\ell-1)M+U_1-1} \to a_{(\ell-1)M+U_1}$ and $a_{\ell M - U_2 - 1} \to a_{\ell M - U_2}$, which may be suspected as breaking the relative (odd-integer multiple of) pi/4 phase rotation assumed in pure Q-STORM between consecutive primary symbols. The associated phase differences $\delta_{BQ}$ and $\delta_{QB}$, respectively, satisfy (when measured of units of $$\frac{\pi}{4})$$

the relations $a_{(\ell-1)M+U_1}/u_{U-1} = e^{j\pi\delta_{BQ}/4}$ and $u_0/a_{\ell M-U_2-1} = e^{j\pi\delta_{QB}/4}$.

Assuming (as before) the Q-STORM rule $a_n = e^{j\pi\alpha_n/4}$, $\alpha_n \equiv n+1 \pmod 2$, it may follow that $\delta_{BQ} \equiv U_1+1 \pmod 2$; $\delta_{QB} \equiv U_2+1 \pmod 2$, so that both $\delta_{BQ}$ and $\delta_{QB}$ may be simultaneously odd—as required for the regular behavior of Q-STORM—only when U is odd. Nevertheless, even when U is even (like M), still the Q-STORM processing based on auxiliary or combined (cyclic) symbol sequence generation followed by pulse shaping (as presented, for example, in the process 200, the process 700, the process 1100A and/or the process 1100B) may be implemented with a small penalty of PAPR performance due to rare transitions between symbols whose phase difference is an even multiple of $$\frac{\pi}{4}.$$

Figure 14:
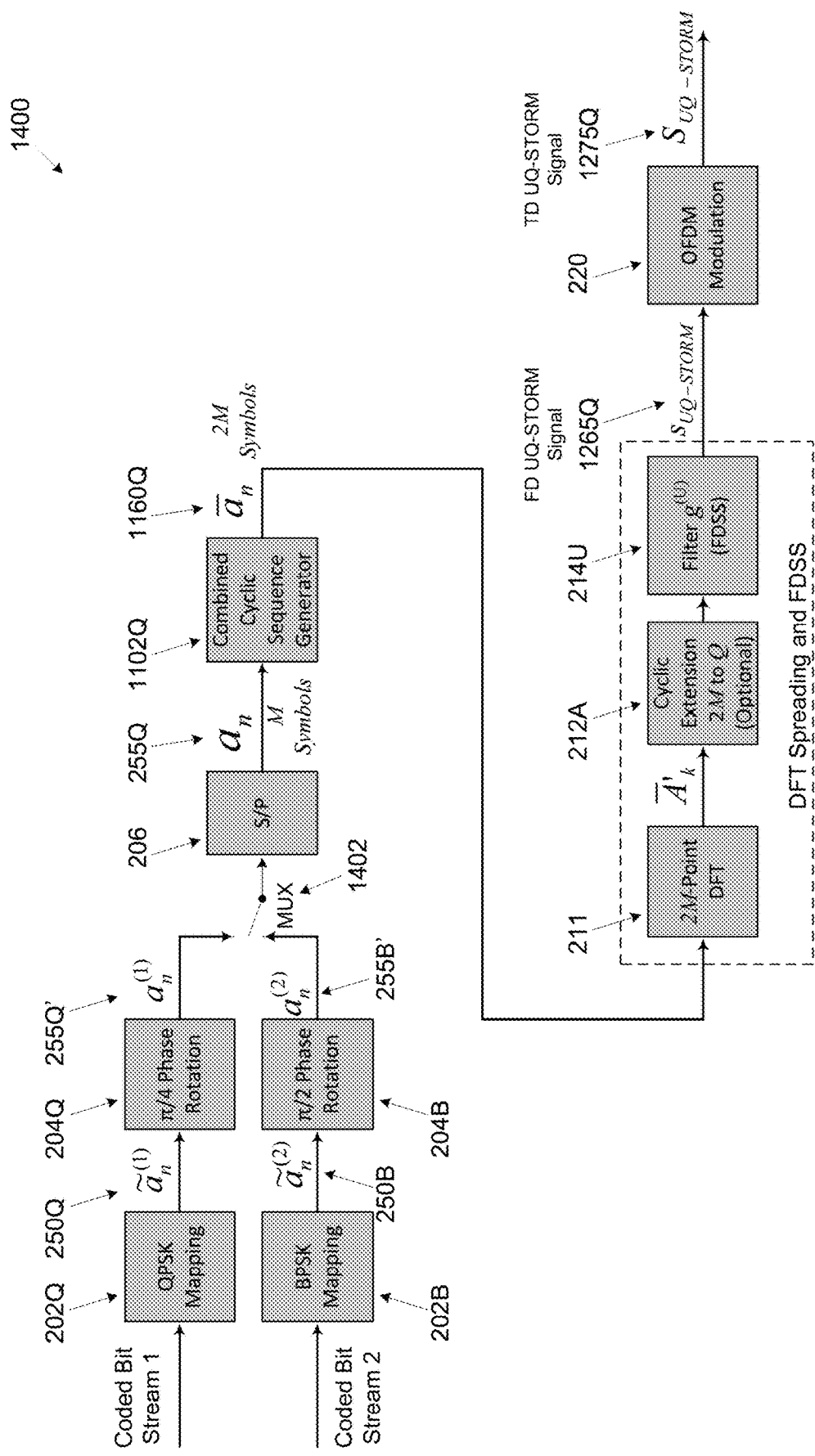
FIG. 14 is a block diagram of a transmitter process utilizing a single universal pulse shaping function to create a low-PAPR hybrid binary and quaternary mode U-STORM signal, according to an embodiment.

Reference is now made to FIG. 14, which is a block diagram of a transmitter process utilizing a single universal pulse shaping function to create a low-PAPR hybrid binary and quaternary mode U-STORM signal, according to an embodiment. A process 1400 may be executed by a processor such as the processor(s) 110 of a transmitter such as the transmitter 102 utilizing a hybrid UB-STORM and UQ-STORM design to generate a TD UQ-STORM signal $S_{UQ-STORM}$ 1175Q in a frequency domain implementation. The processor(s) 110 may operate a mux 1402 to multiplex a pi/2-BPSK symbol stream $\{a_n^{(2)}\}$ 255B' and a pi/4-QPSK symbol stream $\{a_n^{(1)}\}$ 255Q' at the input to a combined sequence generator such as the combined cyclic sequence generator 1102Q. In case the processor(s) 110 operates a MUX 1402 to alternate every odd number of symbols, namely leading to a concatenation of the alternating sub-sequences $\{a_n^{(2)}\}$ 255B' and a $\{a_n^{(1)}\}$ 255Q' of odd lengths, then it can be ensured that all phase differences, between consecutive symbols of the primary sequence $\{a_n\}$ 255Q in each (cyclic) block of (even) M symbols at the output of S/P 206, are odd multiples of $$\frac{\pi}{4}.$$

Consequently, when all remaining steps in the process 1400 (of the generation of the TD UQ-STORM signal $S_{UQ-STORM}$ 1275Q, from the input of symbol sequence $\{a_n\}$ 255Q to the combined cyclic sequence generator 1102Q till the output of OFDM modulation 220) are performed by processor(s) 110 following the same procedure as in the process 1100A particularized to the case P=2, then all the desirable properties of the output UQ-STORM signal may be maintained as in the "pure" UQ-STORM case. Otherwise, if not all the phase differences between consecutive symbols of the primary sequence $\{a_n\}$ are guaranteed to be odd multiples of $$\frac{\pi}{4},$$

the low PAPR behavior may somewhat degrade, depending on the frequency of occurrence of irregular phase transitions within the processed symbol block.

The BPSK- and QPSK-based symbol stream multiplexing mechanism presented above, whose pattern is known in advance to a receiver such as the receiver 104, may be used for various purposes, including facilitating various pilot insertions within a data stream.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant FDM and/or SC transmission technologies will be developed and the scope of the terms FDM and/or SC transmission technologies respectively are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features, which are, for clarity, described in the context of separate embodiments, may also be provided in combination in a single embodiment. Conversely, various features, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as limiting.

What is claimed is:

1. A transmitter, comprising:
a processor configured to create a universal SynThesis Of a near-constant Modulus (STORM) output signal by:
converting a primary sequence of modulation symbols into a primary signal using a universal pulse-shaping function for constructing a universal pulse shape;
converting an auxiliary sequence of modulation symbols, created from the primary sequence, to an auxiliary signal using an altered version of the universal pulse-shaping function for constructing an altered version of the universal pulse shape; and
combining the primary signal and the auxiliary signal to create a joint output signal,
wherein the joint output signal is the universal STORM output signal.

2. The transmitter of claim 1, wherein a peak-to-average power ratio (PAPR) of the output signal is lower than a PAPR of the primary signal.

3. The transmitter of claim 1, wherein the altered version of the universal pulse shape comprises an alteration via a shift in time and/or attenuation of the universal pulse shape.

4. The transmitter of claim 3, wherein the processor is configured to combine the primary signal and the auxiliary signal at a level of the respective modulation symbol sequences to generate an intermediate joint sequence of modulation symbols using information about the altered version of the universal pulse shape.

5. The transmitter of claim 1, wherein the universal pulse shape is a Gaussian pulse shape or an approximation thereof.

6. The transmitter of claim 1, wherein the primary sequence of modulation symbols maps an input bit stream according to at least one of a plurality of modulation schemes, the plurality of modulation schemes including:
a binary-phase shift keying (BPSK) modulation scheme,
a quadrature-phase shift keying (QPSK) modulation scheme,
a higher order phase shift keying (PSK) modulation scheme, and
a quadrature-amplitude modulation (QAM) scheme, and
wherein the primary sequence and the auxiliary sequence further go through complex phase rotation between consecutive symbols by a fraction of $\pi$.

7. The transmitter of claim 6, wherein the primary sequence of modulation symbols switches between at least two of the plurality of modulation schemes while mapping the input bit stream.

8. The transmitter of claim 1, wherein the auxiliary sequence is created from the primary sequence by generating each modulation symbol of the auxiliary sequence from a corresponding modulation symbol of the primary sequence and at least one preceding or subsequent modulation symbol of the primary sequence.

9. The transmitter of claim 1, wherein the processor is configured to perform, when processing is in a frequency domain, at least one of the following operations to the primary sequence, to the auxiliary sequence, and/or to a combined joint sequence thereof:
a discrete Fourier transformation (DFT),
a cyclic extension, and
a filtering process with information about the universal pulse shape and/or about the altered version of the universal pulse shape; and
wherein the processor is configured to perform, when processing is in a time domain, at least one of the following operations to the primary sequence, to the auxiliary sequence, and/or to a combined joint sequence thereof:
an up-sampling, and
a filtering process with information about the universal pulse shape and/or about the altered version of the universal pulse shape.

10. The transmitter of claim 1, wherein a plurality of finite sub-sequences of consecutive symbols of the primary sequence is cyclically extended to create a plurality of respective finite sub-sequences of consecutive symbols of the auxiliary sequence.

11. The transmitter of claim 1, wherein the processor is configured to provide the joint output signal for transmission using any one of:
frequency division multiplexing (FDM),
discrete-Fourier-transform (DFT) spread orthogonal FDM (DFT-s-OFDM),
single carrier FDM (SC-FDM),
a transmission based on frequency division multiple access (FDMA), and/or
a transmission based on interleaved FDMA (IFDMA).

12. The transmitter of claim 1, wherein the processor is further configured to periodically insert, into the primary sequence, at least one fixed finite sequence of symbols including a unique word (UW).

13. The transmitter of claim 1, wherein the processor is further configured to periodically insert guard intervals (GIs) into the time domain joint output signal, the guard intervals including at least one of:
a cyclic prefix (CP),
a cyclic postfix,
a zero prefix (ZP), and
a zero tail (ZT).

14. The transmitter of claim 1, wherein the processor is configured to create the joint output signal to comply with at least one of a plurality of signal spectral constraints.

15. The transmitter of claim 1, wherein the processor is further configured to create at least one demodulation reference signal similarly to the joint output signal.

16. The transmitter of claim 1, wherein the universal STORM output signal is a frequency domain (FD) universal STORM output signal, and wherein the processor is further configured to perform orthogonal frequency division multiplexing (OFDM) modulation to generate, from the FD universal STORM output signal, a time domain (TD) universal STORM output signal.

17. The transmitter of claim 16, wherein the TD universal STORM output signal is a Single-Carrier Frequency Division Multiplexing (SC-FDM)-based STORM waveform.

18. A receiver, comprising:
a processor configured to demodulate a universal Syn-Thesis Of a near-constant Modulus (STORM) input signal received from a transmitter,
wherein the universal STORM input signal is a joint signal created by combining a primary signal and an auxiliary signal,
wherein the primary signal is created by converting a primary sequence of modulation symbols using a single universal pulse shaping function for constructing a universal pulse shape, and
wherein the auxiliary signal is created by converting an auxiliary sequence of modulation symbols using an altered version of the universal pulse shaping function for constructing an altered version of the universal pulse shape.

19. The receiver of claim 18, wherein the processor is configured to apply a single whitening matched filter (WMF) to the input signal in a frequency domain using information about the universal pulse shape to extract an extracted signal and to further detect a transmitted data stream from the extracted signal.

20. The receiver of claim 18, wherein the processor is configured to use at least one demodulation reference signal to demodulate the input signal.

* * * * *

UNITED STATES PATENT AND TRADEMARK OFFICE
CERTIFICATE OF CORRECTION

PATENT NO. : 11,108,609 B2
APPLICATION NO. : 16/806607
DATED : August 31, 2021
INVENTOR(S) : Levinbook et al.

It is certified that error appears in the above-identified patent and that said Letters Patent is hereby corrected as shown below:

On the Title Page

Page 2, Item (56) Other Publications, Citation 4: "EZRI, "Introducing STORM-Near 0db PART Waveform for mmWave" should read -- EZRI, "Introducing STORM-Near 0db PAPR Waveform for mmWave --.

Page 2, Item (56) Other Publications, Citation 6: "(May 23-27, 2017)." should read -- (May 23-27, 2016). --.

Signed and Sealed this
Twenty-eighth Day of June, 2022

Katherine Kelly Vidal
*Director of the United States Patent and Trademark Office*